(12) United States Patent
Zhu et al.

(10) Patent No.: US 12,254,700 B2
(45) Date of Patent: Mar. 18, 2025

(54) METHOD AND SYSTEMS FOR DETECTION ACCURACY RANKING AND VEHICLE INSTRUCTIONS

(71) Applicant: Hitachi Astemo, Ltd., Ibaraki (JP)

(72) Inventors: Xiaoliang Zhu, Northville, MI (US); Subrata Kumar Kundu, Canton, MI (US); Paul Liu, San Jose, CA (US)

(73) Assignee: Hitachi Astemo, Ltd., Ibaraki (JP)

( * ) Notice: Subject to any disclaimer, the term of this patent is extended or adjusted under 35 U.S.C. 154(b) by 653 days.

(21) Appl. No.: 17/519,317

(22) Filed: Nov. 4, 2021

(65) Prior Publication Data

US 2023/0140079 A1     May 4, 2023

(51) Int. Cl.
*G06V 20/58*     (2022.01)
*G06F 16/23*     (2019.01)
(Continued)

(52) U.S. Cl.
CPC .......... *G06V 20/58* (2022.01); *G06F 16/2379* (2019.01); *G06F 18/25* (2023.01);
(Continued)

(58) Field of Classification Search
CPC .. G06V 20/58; G06T 7/70; G06T 7/20; G06T 7/60; G06F 16/2379; G06F 18/25
See application file for complete search history.

(56) References Cited

U.S. PATENT DOCUMENTS

| | | | |
|---|---|---|---|
| 8,597,027 B2 * | 12/2013 | Staplin | G09B 9/052 434/69 |
| 8,766,817 B2 | 7/2014 | Sri-Jayantha | |

(Continued)

FOREIGN PATENT DOCUMENTS

| | | | | |
|---|---|---|---|---|
| EP | 3222973 A2 * | 9/2017 | ............. | G01C 21/32 |
| EP | 3358303 A1 * | 8/2018 | ............. | G01C 21/32 |

(Continued)

OTHER PUBLICATIONS

Nguyen et al., 2019, "Response-based methods to measure road surface irregularity: a state-of-the-art review" (pp. 1-18) (Year: 2019).*

*Primary Examiner* — Manav Seth
(74) *Attorney, Agent, or Firm* — PROCOPIO, CORY, HARGREAVES & SAVITCH LLP

(57) ABSTRACT

A system comprising at least one hardware processor for updating a cloud-based road anomaly database is disclosed, wherein the system receives information from a vehicle regarding an object detected by one or more sensors of the vehicle, the information may include a location and/or a size of the detected object; compares the location and/or the size of the first detected object against data stored in a road feature database regarding the first detected object; determines, based on comparing the location and/or the size, an accuracy score associated with the first detected object and the second detected object; and updates the cloud-based road anomaly database with the received information for the second detected object based on the associated accuracy score being higher than at least one of a threshold accuracy score or an accuracy score associated with corresponding object information stored in the cloud-based road anomaly database.

13 Claims, 17 Drawing Sheets

(51) Int. Cl.
*G06F 18/25* (2023.01)
*G06T 7/20* (2017.01)
*G06T 7/60* (2017.01)
*G06T 7/70* (2017.01)

(52) U.S. Cl.
CPC ............... *G06T 7/20* (2013.01); *G06T 7/60* (2013.01); *G06T 7/70* (2017.01)

(56) References Cited

U.S. PATENT DOCUMENTS

| | | | | |
|---|---|---|---|---|
| 9,633,258 | B2 | 4/2017 | Culp et al. | |
| 10,049,129 | B2 * | 8/2018 | Lynch | G01C 21/30 |
| 10,480,949 | B2 * | 11/2019 | Tateishi | G01S 7/4808 |
| 10,546,200 | B2 * | 1/2020 | Averbuch | G06V 20/588 |
| 11,113,545 | B2 * | 9/2021 | Kundu | G06V 20/582 |
| 11,249,984 | B2 * | 2/2022 | Averbuch | G06F 16/2379 |
| 11,510,026 | B2 * | 11/2022 | Ivanov | G01S 5/16 |
| 11,698,466 | B2 * | 7/2023 | Nie | H04W 4/46 455/456.1 |
| 11,790,665 | B2 * | 10/2023 | Bangalore Ramaiah | G06T 9/00 382/104 |
| 11,940,290 | B2 * | 3/2024 | Eshet | G01C 21/3602 |
| 2004/0107042 | A1 | 6/2004 | Seick | |
| 2016/0350173 | A1 * | 12/2016 | Ahad | H04L 67/02 |
| 2022/0172606 | A1 * | 6/2022 | Pandya | G08G 1/052 |
| 2024/0248982 | A1 * | 7/2024 | Ezrielev | G06N 20/00 |

FOREIGN PATENT DOCUMENTS

| | | | | |
|---|---|---|---|---|
| EP | 3869833 A1 * | 8/2021 | ............ | G01S 19/07 |
| JP | 2011027594 A | 2/2011 | | |
| JP | 2011027595 A | 2/2011 | | |
| WO | WO-2020165650 A2 * | 8/2020 | ............ | B60W 10/18 |
| WO | WO-2020214294 A1 * | 10/2020 | ......... | G06K 9/00805 |

* cited by examiner

METHOD AND SYSTEMS FOR DETECTION ACCURACY RANKING AND VEHICLE INSTRUCTIONS

FIELD OF THE INVENTION

The embodiments described herein are generally directed to connected vehicle technology and the sharing of detected road hazards.

RELATED ART

According to the National Highway Traffic Safety Administration (NHTSA), there are over 5 million crashes on American roads every year, causing over 30,000 deaths, and many more serious injuries. Many of the fatalities in car accidents are caused by deficient roadway conditions, e.g., defective road design, potholes, debris, cracks on the road, construction and work zones, and other such hazards. Over the years, many technologies have evolved to improve driving safety, e.g., airbags, anti-lock brakes, lane keeping, automatic emergency braking, and other such technologies. Although these passive and semi-active systems and technologies improve driving safety and may reduce the number of fatalities, due to their limitations in response time and detection range, the protection to the drivers may be limited by focusing on a local area. Modern vehicles may be equipped with more and more advanced sensors, e.g., a stereo camera, a radar, surround view cameras, and so on, as well as a number of engine control units (ECUs) and onboard chips with computing powers that keep increasing. These advanced and powerful ECUs enable the processing of more sensor data, and thus provides extra safety functionalities to avoid collisions, e.g. lane keeping, emergency breaking, adaptive cruise control. Additionally, some information can also be shared to a cloud-based platform (e.g., Vehicle-to-cloud (V2C)), to other vehicles (V2V), to pedestrians (V2P), to road infrastructure (V2I), or in a broader definition, vehicle to everything (V2X).

Internet of things (IoT)-based solution have been suggested for connected vehicles to enable automotive manufacturers to build and run their applications that gather, process, and analyze on connected vehicle data. Some IoT-based solutions may provide a secure platform with low latency and overhead to manage and connect vehicles to a cloud-based infrastructure. Current methods and technologies for connected vehicles may focus on basic functionalities related to connection, sharing of data, and data combination in a database. However, the methods and technologies may not consider detection accuracy.

Road hazards like pothole, debris, or other anomaly on the road pose great danger for driving safety and comfort. Connected vehicle technologies may be implemented to collect and share data regarding road anomalies that are detected from vehicles equipped with advanced sensors and algorithms, e.g., a stereo camera, a light detection and ranging (Lidar) system, a surround view camera, or other such sensors. During implementation, these conventional methods face disadvantages associated with low accuracy, false detection results, and huge amounts of similar data relating to a same road anomaly (e.g., from multiple vehicles).

The prior art discusses performing basic functions of 1) collecting data regarding hazard detection for incorporation into a platform for visualization or processing, and 2) identifying differences between a detected hazard with stored map data. However, the challenges of data accuracy and mechanisms of data sorting and selection remain.

Connected Vehicle technology has been a vital point for the improvement of driving safety and comfort by sharing the detected road hazards with others. However, vehicles will be equipped with various sets of sensors, and different sensor suites performance are different and will be skewed over time. As a result, the detected and shared road hazards information from vehicles are mixed with low-accurate or noisy data. How to ensure the data shared from vehicles is accurate enough to be added into the road hazard database becomes a big challenge.

SUMMARY

Accordingly, systems and methods are disclosed that update a cloud-based road anomaly database with data collected from multiple vehicles. Additionally, the disclosed systems and methods may select particular data for a particular road feature (e.g., static features or dynamic features) from data collected from multiple vehicles based on a relative accuracy of the data received from the multiple vehicles.

In embodiments, a system for updating a cloud-based road anomaly database is disclosed, wherein the system comprises at least one hardware processor that receives information from a vehicle regarding an object detected by one or more sensors of the vehicle, the information comprising at least one of a location or a size of the detected object; compares at least one of the location or the size of the first detected object against data stored in a road feature database regarding the first detected object; determines, based on comparing the at least one of the location or the size, an accuracy score associated with the first detected object and the second detected object; and updates the cloud-based road anomaly database with the received information for the second detected object based on the associated accuracy score being higher than at least one of a threshold accuracy score or an accuracy score associated with corresponding object information stored in the cloud-based road anomaly database.

In some embodiments, a method for updating a cloud-based road anomaly database is disclosed, the method comprising: receiving information from a vehicle regarding a first object and a second object detected by one or more sensors of the vehicle, the information comprising at least one of a location or a size of the detected object; comparing at least one of the location or the size of the first detected object against data stored in a road feature database regarding the first detected object; determining, based on comparing the at least one of the location or the size, an accuracy score associated with the first detected object and the second detected object; and updating the cloud-based road anomaly database with the received information for the second detected object based on the associated accuracy score being higher than at least one of a threshold accuracy score or an accuracy score associated with corresponding object information stored in the cloud-based road anomaly database.

In some embodiments, a non-transitory computer-readable medium storing a program for updating a cloud-based road anomaly database is disclosed. The program, when executed by at least one hardware processor receives information from a vehicle regarding a first object and a second object detected by one or more sensors of the vehicle, the information comprising at least one of a location or a size of the detected object; compares at least one of the location or the size of the first detected object against data stored in a road feature database regarding the first detected object; determines, based on comparing the at least one of the location or the size, an accuracy score associated with the first detected object and the second detected object; and updates the cloud-based road anomaly database with the received information for the second detected object based on the associated accuracy score being higher than at least one of a threshold accuracy score or an accuracy score associated with corresponding object information stored in the cloud-based road anomaly database.

In some embodiments, a system for updating a cloud-based road anomaly database is disclosed, wherein the system comprises: means for receiving information from a vehicle regarding a first object and a second object detected by one or more sensors of the vehicle, the information comprising at least one of a location or a size of the first detected object and of the second detected object; means for comparing at least one of the location or the size of the first detected object against data stored in a road feature database regarding the first detected object; means for determining, based on comparing the at least one of the location or the size, an accuracy score associated with the first detected object and the second detected object; and means for updating the cloud-based road anomaly database with the received information for the second detected object based on the associated accuracy score being higher than at least one of a threshold accuracy score or an accuracy score associated with corresponding object information stored in the cloud-based road anomaly database.

The system, method, or computer-readable medium, in some aspects, may further include or be configured to: determine a path of the vehicle; identify at least one set of object information stored in the cloud-based road anomaly database associated with an object along the determined path; predict an accuracy score for information from the vehicle regarding the object along the determined path; and transmit, based on the predicted accuracy score, an indication of a sensor configuration to the vehicle. In some aspects, the indication of the sensor configuration comprises: a high-sensitivity configuration when the predicted accuracy score is higher than the accuracy score of the information stored in the cloud-based road anomaly database associated with the object along the determined path; and a low-sensitivity configuration when the predicted accuracy score is lower than the accuracy score of the information stored in the cloud-based road anomaly database associated with the object along the determined path.

The system, method, or computer-readable medium, in some aspects, may also include or be configured to: receive information from the vehicle regarding one or more additional objects detected by the one or more sensors of the vehicle, the information comprising at least one of a location or a size of the detected one or more additional objects. Determining the accuracy score associated with the detected object may further comprise determining the accuracy score based on the received information regarding the one or more additional objects and the accuracy score may be associated with each of the detected object and the detected one or more additional objects. In some aspects, an accuracy score comprises an accuracy score for at least one of a first direction, a second direction, a third direction, a longitude, or a latitude. The received information regarding the detected object, in some aspects, comprises information regarding a plurality of instances of detecting the object and the accuracy score is based on the plurality of instances.

The system, method, or computer-readable medium, in some aspects, may also include or be configured to: receive information from the vehicle regarding an additional object detected by the one or more sensors of the vehicle, wherein the received information regarding the detected additional object comprises information regarding a first number of instances of detecting the additional object; determine that no data regarding a corresponding object is stored in the cloud-based road anomaly database; and add the detected additional object to the cloud-based road anomaly database based on the first number of instances being greater than a threshold number of detection instances. The system, method, or computer-readable medium, in some aspects, may also include or be configured to: determine an accuracy score associated with the first number of instances of detecting the additional object, wherein adding the detected additional object to the cloud-based road anomaly database is further based on the accuracy score representing an accuracy that is greater than a threshold accuracy.

The system, method, or computer-readable medium, in some aspects, may also include or be configured to: receive information from the vehicle regarding an additional object detected by the one or more sensors of the vehicle; determine an additional accuracy score associated with the detected additional object; determine that data associated with a corresponding object is stored in the cloud-based road anomaly database, the stored data comprising a stored accuracy score; and not update the cloud-based road anomaly database with the received information for the detected additional object based on the stored accuracy score being lower than the stored accuracy score.

In embodiments, a system for providing data to a cloud-based route generation system to update a cloud-based road anomaly database of the cloud-based route generation system is disclosed, wherein the system comprises at least one hardware processor that transmits information regarding a trajectory of the vehicle to the cloud-based route generation system; receives, from the cloud-based route generation system, an indication of at least one sensor configuration associated with at least one corresponding location associated with the trajectory of the vehicle; detects at least one object based on the at least one indicated sensor configuration; and transmits information regarding the at least one object detected by the indicated sensor configuration to the cloud-based route generation system.

In some embodiments, a method for updating a cloud-based road anomaly database is disclosed, the method comprising: transmitting information regarding a trajectory of the vehicle to the cloud-based route generation system; receiving, from the cloud-based route generation system, an indication of at least one sensor configuration associated with at least one corresponding location associated with the trajectory of the vehicle; detecting at least one object based on the at least one indicated sensor configuration; and transmitting information regarding the at least one object detected by the indicated sensor configuration to the cloud-based route generation system.

In some embodiments, a non-transitory computer-readable medium storing a program for updating a cloud-based road anomaly database is disclosed. The program, when executed by at least one hardware processor transmits information regarding a trajectory of the vehicle to the cloud-based route generation system; receives, from the cloud-based route generation system, an indication of at least one sensor configuration associated with at least one corresponding location associated with the trajectory of the vehicle; detects at least one object based on the at least one indicated sensor configuration; and transmits information regarding the at least one object detected by the indicated sensor configuration to the cloud-based route generation system.

In some embodiments, a system for updating a cloud-based road anomaly database is disclosed, wherein the system comprises: means for transmitting information regarding a trajectory of the vehicle to the cloud-based route generation system; means for receiving, from the cloud-based route generation system, an indication of at least one sensor configuration associated with at least one corresponding location associated with the trajectory of the vehicle; means for detecting at least one object based on the at least one indicated sensor configuration; and means for transmitting information regarding the at least one object detected by the indicated sensor configuration to the cloud-based route generation system.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Embodiments of updating a cloud-based road anomaly database with data collected from multiple vehicles are disclosed in the present application. After reading this description, it will become apparent to one skilled in the art how to implement the cloud-based road anomaly database updating in various alternative embodiments and alternative applications. However, although various embodiments and applications will be described herein, it is understood that these embodiments and applications are presented by way of example and illustration only, and not limitation. As such, this detailed description should not be construed to limit the scope or breadth of the present invention as set forth in the appended claims. In addition, example features and functions described herein can be utilized, in various embodiments, either singularly or in combination with other features and functions, and may be implemented through any means that are presently known or which arise in the future. Furthermore, while processes, described herein, may be illustrated with a certain arrangement and ordering of subprocesses, each process may be implemented with fewer, more, or different subprocesses and a different arrangement and/or ordering of subprocesses. It should also be understood that any subprocess which does not depend on the completion of another subprocess may be executed before, after, or in parallel with that other independent subprocess, even if the subprocesses are described or illustrated in a particular order.

Figure 1:
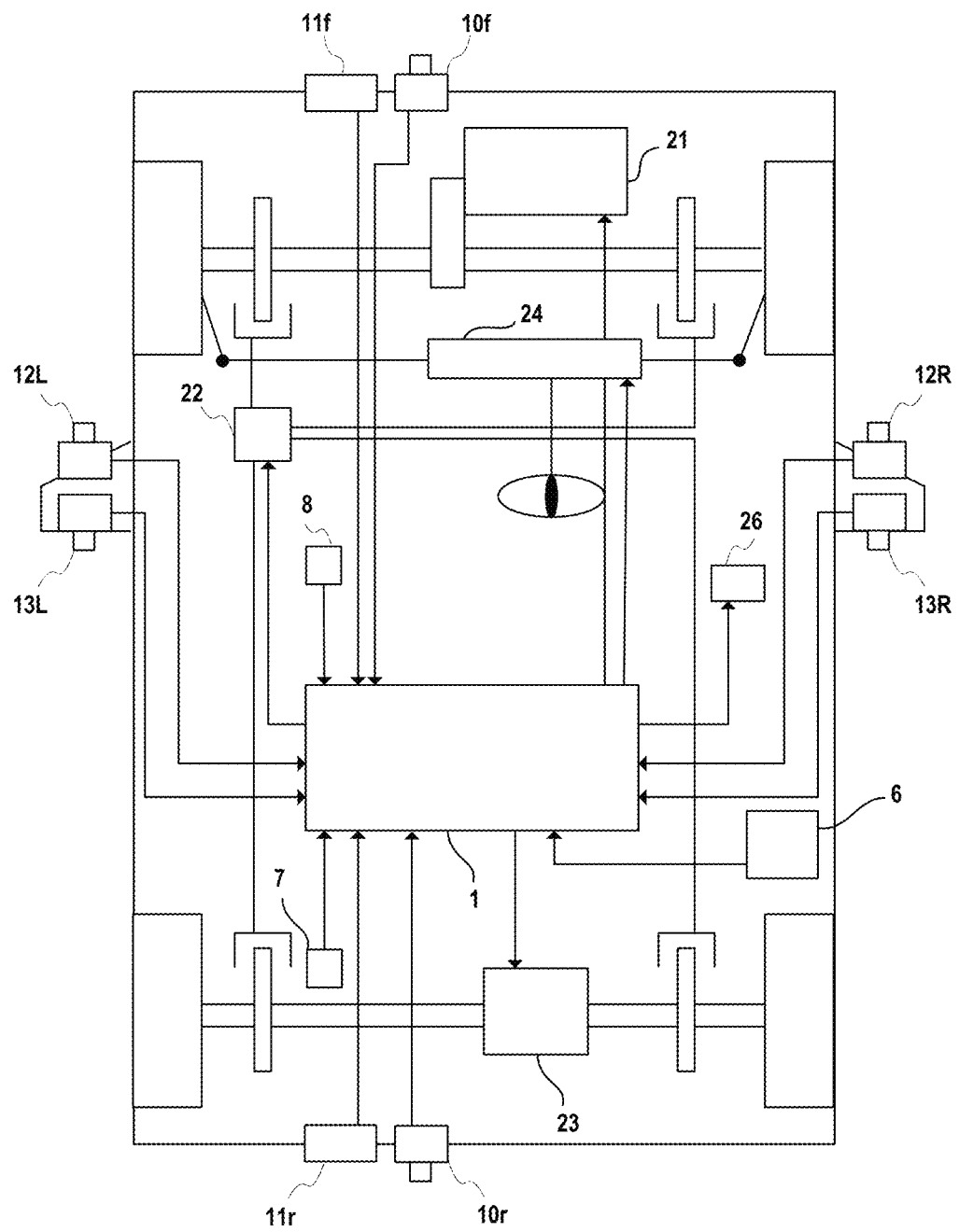
FIG. 1 illustrates a vehicle system, in accordance with an example implementation.

FIG. 1 illustrates a vehicle system, in accordance with an example implementation. Specifically, FIG. 1 illustrates an example human operated vehicle system configured to operate in a human operated mode and an autonomous mode. The autonomous driving/advanced driver assistance systems (AD/ADAS) ECU 1 is connected to a map positioning unit 6 to receive signals from the map positioning unit 6. Those signals represent a set route, map data, the position of the vehicle on a map, the direction of the vehicle, lane information, such as the number of lanes, speed limit, and types of roads/vehicle locations (e.g., highways and general motorways, branch roads, toll booths, parking lots or garages, etc.).

The vehicle is provided with an operation parameter measuring unit for measuring values of parameters indicating the operating condition of the vehicle, which can include wheel speed measuring device 7, and vehicle behavior measuring device 8. Signals provided by those devices are sent to the AD/ADAS ECU 1. The vehicle behavior measuring device 8 measures longitudinal acceleration, lateral acceleration and yaw rate.

The vehicle is provided with environmental condition measuring devices for measuring conditions of the environment around the vehicle, including a front camera 10*f*, a front radar 11*f*, a rear camera 10*r*, a rear radar 11*r*, a left front camera 12L, a right front camera 12R, a left rear camera 13L and a right rear camera 13R. Those environmental condition measuring devices send information about lane marks, obstacles, and asymmetrical markers around the vehicle to the AD/ADAS ECU 1.

The cameras of the vehicle can be in the form of surround eye cameras, or other cameras depending on the desired implementation. In the camera system of the vehicle, the front camera 10*f* is provided with an image pickup unit for obtaining an image of one or more asymmetrical markers around the vehicle, and an output unit that provides signals representing the positional relation between the vehicle and the one or more asymmetrical markers. The front radar 11ƒ detects and locates other vehicles and pedestrians and provides signals representing positional relation between the vehicle and those objects. The rear camera 10r, the left front camera 12L, the right front camera 12R, the left rear camera 13L and the right rear camera 13R are similar in functionality to the front camera 10ƒ, and the front radar 11ƒ and the rear radar 11r.

The vehicle is provided with an engine 21, an electronically controlled brake system 22, an electronically controlled differential mechanism 23, and an electronically controlled steering system 24. The AD/ADAS ECU 1 gives drive signals to actuators included in those systems 22, 23 and 24 on the basis of values of manipulated variables given by the driver and/or environmental conditions such as the detection of asymmetrical markers or engagement of various autonomous modes for the vehicle system as described herein. When the vehicle needs to be accelerated, the controller 1 gives an acceleration signal to the engine 21. When the vehicle needs to be decelerated, the controller gives a deceleration signal to the electronically controlled brake system 22. When the vehicle needs to be turned, the AD/ADAS ECU 1 gives a turn signal to at least one of the electronically controlled brake system 22, the electronically controlled differential mechanism 23 and the electronically controlled steering system 24.

The electronically controlled brake system 22 is a hydraulic brake system capable of controlling individual braking forces respectively applied to the wheels. The electronically controlled brake system applies braking forces to either the right wheels or the left wheels in response to a turning request to apply a yawing moment to the vehicle. The electronically controlled differential mechanism 23 drives an electric motor or a clutch to generate a torque difference between the right axle and the left axle in response to a turning request to apply a yawing moment to the vehicle. The electronically controlled steering system 24 is, for example, a steer-by-wire steering system capable of correcting the steering angle independently of the turning angle of the steering wheel in response to a turning request to apply a yawing moment to the vehicle.

The vehicle is provided with an information output unit 26. The information output unit 26 displays images, generates sounds, and turns on warning lights representing information about supporting operations according to the type of the driving support operation. The information output unit 26 is, for example, a monitor provided with a built-in loudspeaker. Plural information output units may be installed in the vehicle.

The system as illustrated in FIG. 1 is an example implementation of the vehicle system as described herein, but other configurations are also possible and fall within the scope of the example implementations, and the present disclosure is not limited to the configuration as illustrated in FIG. 1. For example, cameras may be installed on the top or the roof of the vehicle for the purposes of detecting asymmetrical markers that are placed on walls, road signs, billboards and so on.

Figure 2:
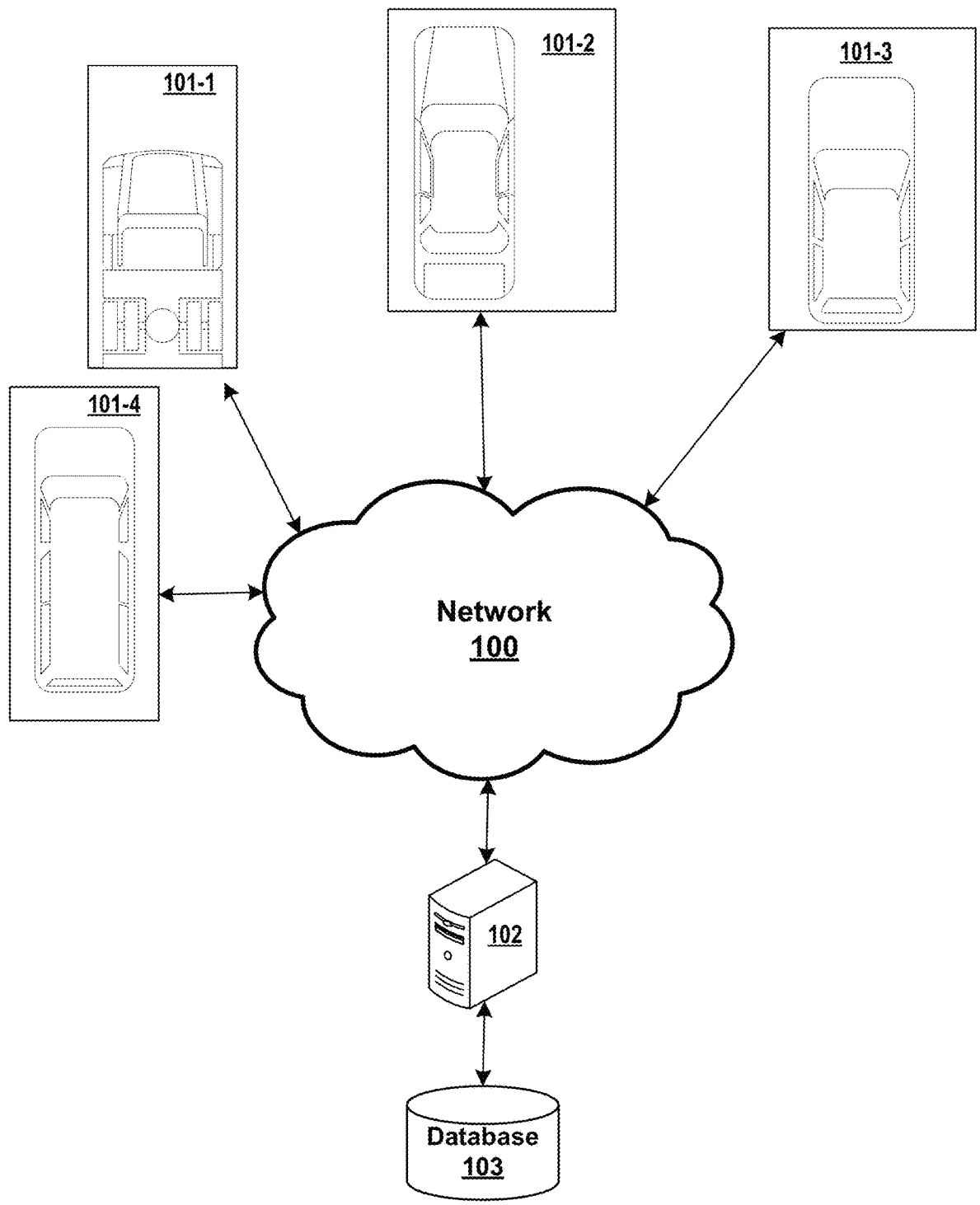
FIG. 2 illustrates a plurality of vehicle systems and a management apparatus, in accordance with an example implementation.

FIG. 2 illustrates a plurality of vehicle systems and a management apparatus, in accordance with an example implementation. One or more vehicle systems 101-1, 101-2, 101-3, and 101-4 as described with respect to FIG. 1 are communicatively coupled to a network 100 which is connected to a management apparatus 102. The management apparatus 102 manages a database 103, which contains data feedback aggregated from the vehicle systems in the network 100. In alternate example implementations, the data feedback from the vehicle systems 101-1, 101-2, 101-3, and 101-4 can be aggregated to a central repository or central database such as proprietary databases that aggregate data from systems such as enterprise resource planning systems, and the management apparatus 102 can access or retrieve the data from the central repository or central database. Such vehicle systems can include human operated vehicles such as cars, trucks, tractors, vans, and so on depending on the desired implementation.

Figure 4:
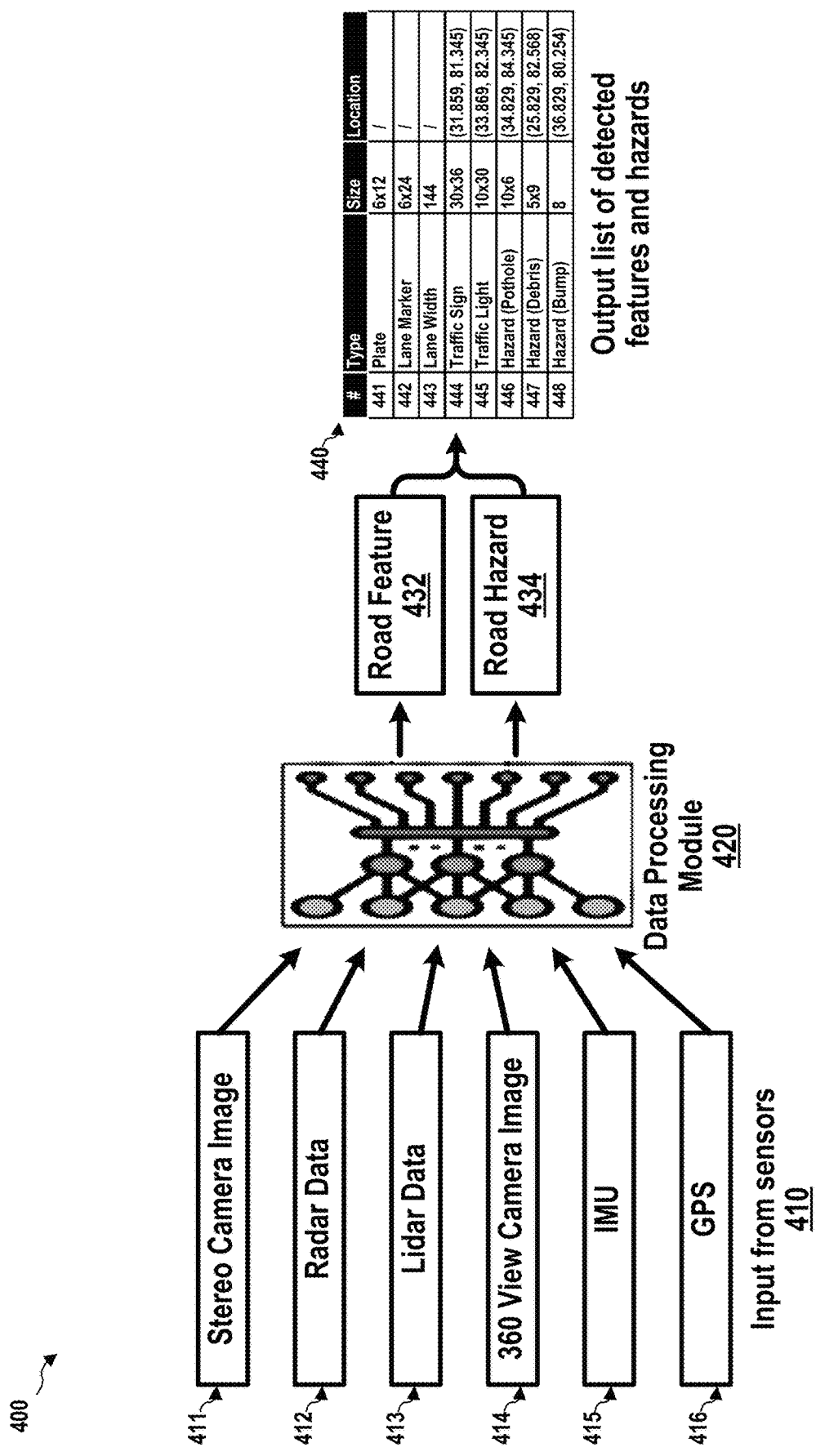
FIG. 4 is a diagram illustrating an example implementation of the inputs and outputs of a data processing module.

Management apparatus 102 can be configured to receive position information from vehicle systems 101-1, 101-2, 101-3, and 101-4 which transmit the position of the corresponding vehicle system relative to a marker as described in FIG. 4(*a*), and further configured to transmit instructions to the vehicle systems 101-1, 101-2, 101-3, 101-4 that are indicative of a trajectory for the vehicle until a next marker, and/or to adjust an operation mode, position, speed, and/or orientation.

Figure 3:
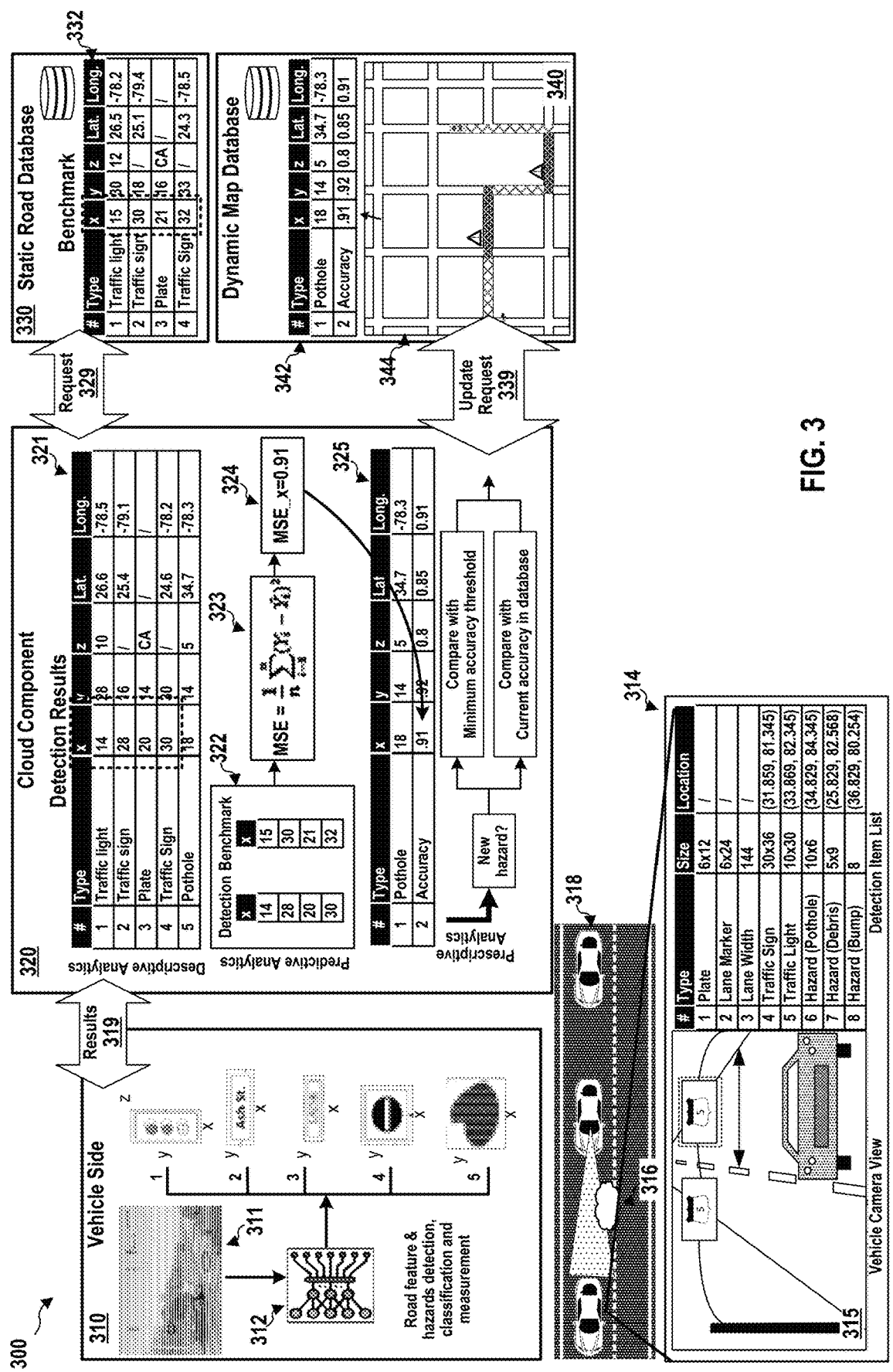
FIG. 3 illustrates a system for updating a cloud-based road anomaly database.

FIG. 3 illustrates a system for updating a cloud-based road anomaly database. The system may include a vehicle side 310 implemented in a set of one or more vehicles (e.g., vehicle 318). In some aspects, a vehicle 318 may capture at least one image 311 from an associated camera. The vehicle 318 may capture additional data from additional sensors (e.g., a stereo camera, a Lidar system, a surround view camera, or other such sensors) regarding one or more features (e.g., features 1-5). The captured image 311 (and other sensor data) may be provided to a data processing module 312 (e.g., employing one or more of probabilistic methods, statistical methods, knowledge-based methods, evidence reasoning methods, or other data fusion algorithms or methods) to identify one or more road features or hazards (e.g., features 1-5). For example, the vehicle 318 may capture an image 315 and identify a set of road features and hazards and associated data in the detection item list 314 (e.g., including pothole 316). The data associated with the identified road features and hazards may include a size in one or more directions. The data associated with the identified road features and hazards may further include a location (e.g., a latitude and longitude) for the road feature or hazard. The identified road features or hazards may be transmitted as results 319 to a cloud component 320.

The cloud component 320 may receive the results 319 from a particular vehicle (e.g., vehicle 318). The results 319 may include detection results 321 regarding a set of road features (e.g., entries 1-4) and hazards (e.g., entry 5). The cloud component 320 may make a request 329 for benchmark data points from a static road database 330 that stores data 332 regarding static road features (e.g., entries 1-4 of detection results 321). In some aspects, an accuracy (e.g., mean square error (MSE) 324) may be computed for one or more components of the data (e.g., a size in each of three orthogonal directions, a latitude, and a longitude). For example, for a first ("x") direction component, a set of detection data points and corresponding benchmark data points 322 may be used to calculate an accuracy of the detected data (e.g., calculate an accuracy score). An MSE 324 (or other measure of accuracy) may be calculated for the x direction based on equation 323. The MSE 324 (or other accuracy measure/score) may be associated (e.g., in a data structure 325) with a particular road feature or hazard (e.g., a dynamic road feature or hazard). In some aspects, the accuracy score is used to determine whether to add the identified road feature or hazard to a dynamic map database

340 as an entry (or set of entries) 342 or to update an existing entry or set of entries in the dynamic map database 340. If the cloud component 320 determines to update the dynamic map database 340, the cloud component 320 may make an update request 339 to dynamic map database 340. In some aspects, the dynamic map database 340 may associate the detected hazards with a map 344.

In some aspects, the main functionality of a vehicle side (e.g., vehicle side 310 of FIG. 3) is fusing captured information from various onboard sensors and providing the detection results (e.g., results 319 of FIG. 3) to a cloud component (e.g., cloud component 320 of FIG. 3). The detection results may include results in different categories (e.g., road feature and road hazards) with associated dimensions (and GPS positions for results for which location is relevant). To accomplish this fusion, one or more different fusion algorithms (e.g., Artificial Intelligence (AI) or Deep Neural Networks (DNN) models) may be utilized by a data processing module, where the data from various sensors feed into the one or more different fusion models. The one or more different fusion models, in some aspects, may output a list of the detection result with at least one of type, size, and/or location information associated with each detected object.

FIG. 4 is a diagram 400 illustrating an example implementation of the inputs and outputs of a data processing module. The input from the sensors 410 may include one or more of stereo camera image input 411, radar data input 412, lidar data input 413, 360° view camera image input 414, inertial measurement unit (IMU) input 415, and global positioning system (GPS) input 416. The input from the sensors 410 may be provided to data processing module 420. The data processing module 420 may include a fusion algorithm/method for incorporating different types of input. The fusion algorithm may include one or more of probabilistic methods, statistical methods, knowledge-based methods, evidence reasoning methods, or other data fusion algorithms or methods illustrated in FIG. 5. Alternatively, the data processing module 420 may employ a deep learning-based fusion algorithm/method including recurrent neural networks or convolutional neural networks (e.g., including single-stage detectors and two-stage detectors) as illustrated in FIG. 6.

The data processing module 420, in some aspects, may produce (or identify) a set of road features 432 and a set of road hazards 434. The sets of road features 432 and the set of road hazards 434 may be combined into an output list of detected features and hazards 440. The output list of detected features and hazards 440 may include a set of road features, e.g., a license plate 441, a lane marker 442, a lane width 443, a traffic sign 444, and a traffic light 445. Some road features may be associated with a location (e.g., fixed features like a traffic sign 444, a traffic light 445, or other signage) while other road features may not be associated with a location (e.g., non-fixed features like license plates 441 or features for which location is unimportant such as lane markers 442 or a lane width 443). In some aspects, identified road hazards, e.g., pothole 446, debris 447, and bump 448, may be associated with a location (e.g., a longitude and a latitude).

Figure 5:
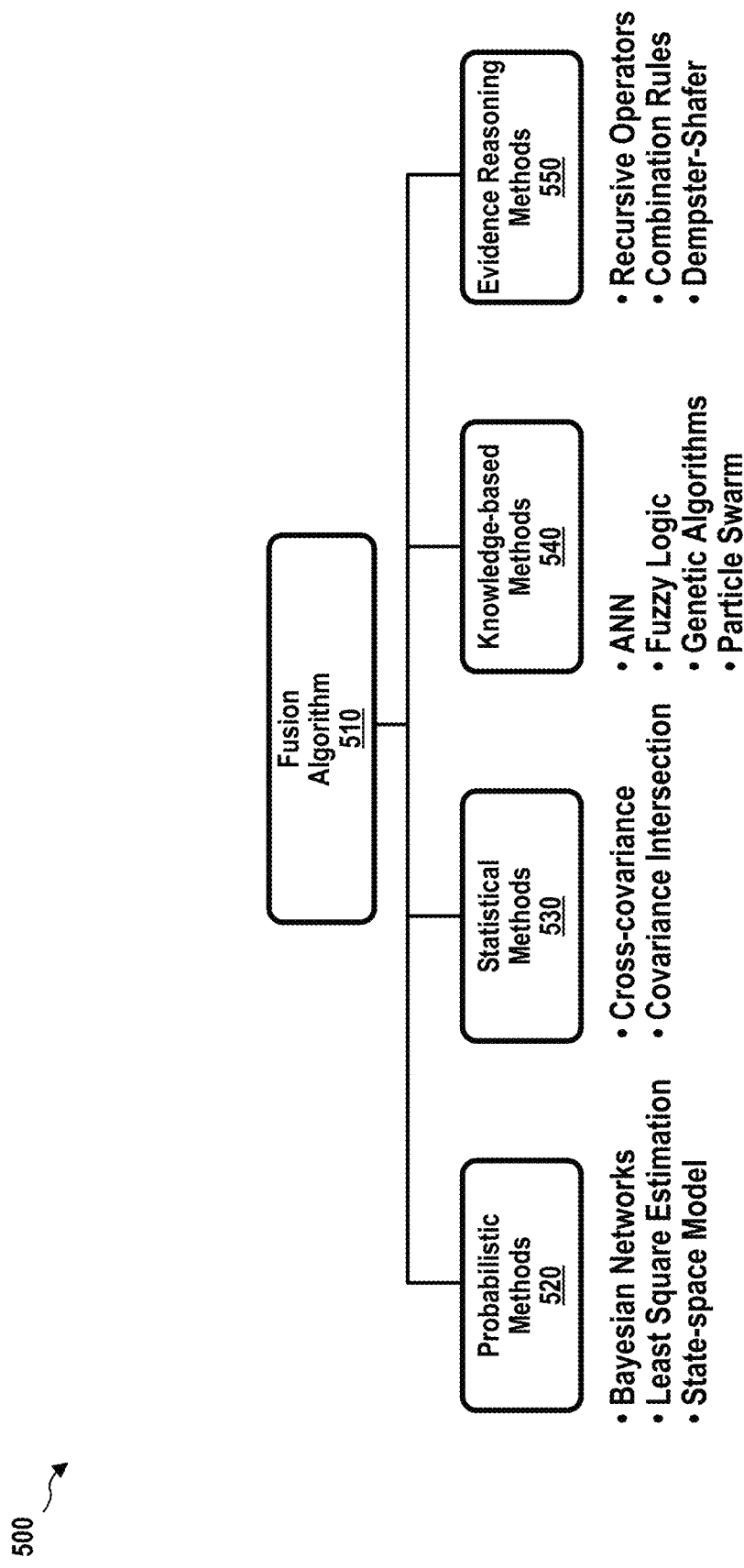
FIG. 5 is a diagram illustrating a set of fusion algorithms that may be used in some implementations of the invention.

FIG. 5 is a diagram 500 illustrating a set of fusion algorithms 510 that may be used in some implementations of the invention. The set of fusion algorithms 510 may include one or more of probabilistic methods 520, statistical methods 530, knowledge-based methods 540, evidence reasoning methods 550. The probabilistic methods 520, in some aspects, may include Bayesian networks, least square estimation, state-space modeling, or other similar probabilistic methods. In some aspects, the statistical methods 530 may include cross-covariance, covariance intersection, or other statistical methods. Knowledge-based methods 540, in some aspects, may include artificial neural networks (ANN), fuzzy logic, genetic algorithms, particle swarm, or other knowledge-based methods. In some aspects, evidence reasoning methods 550 may include recursive operators, combination rules, Dempster-Shafer methods, or other evidence reasoning methods.

Figure 6:
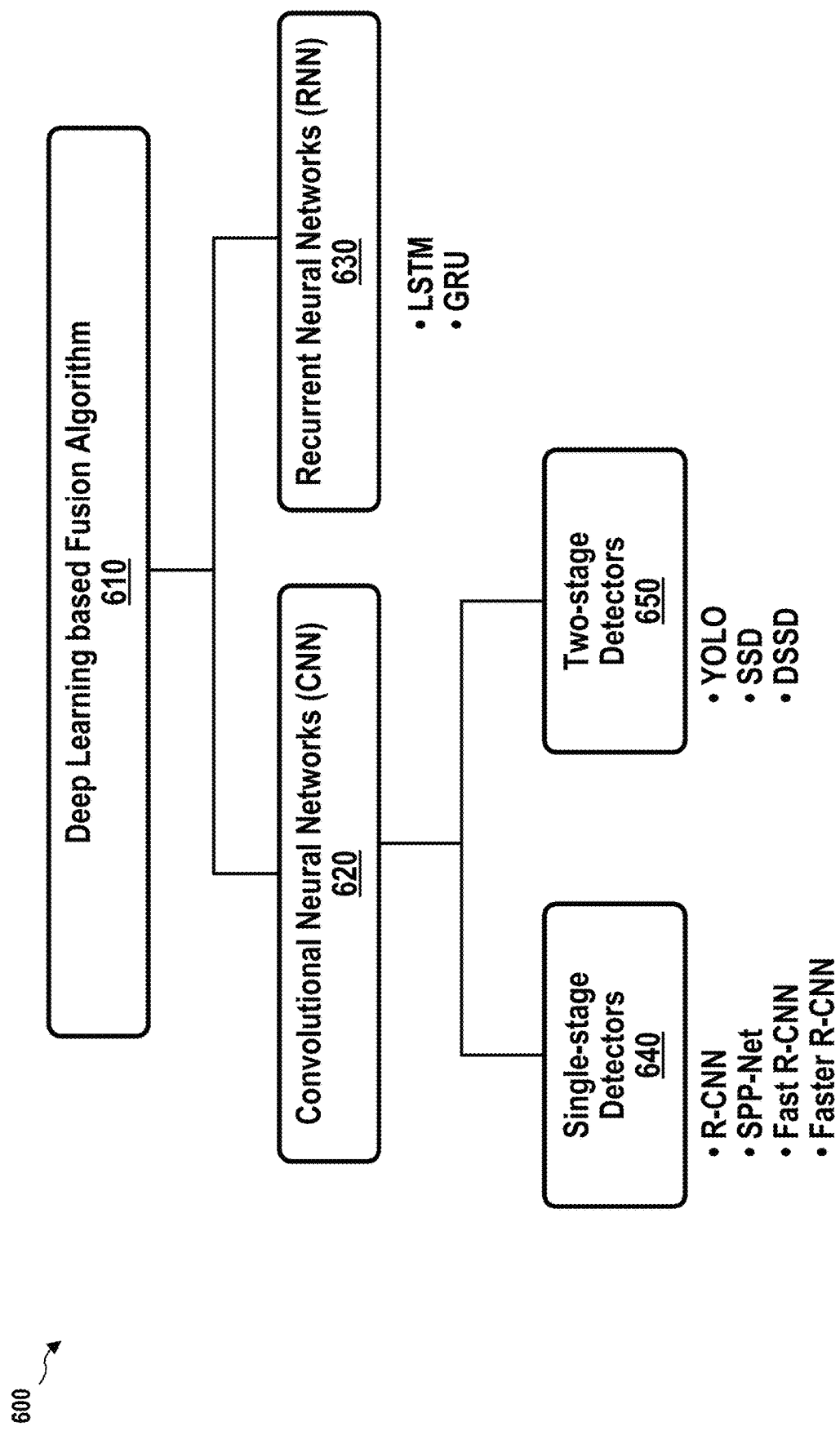
FIG. 6 is a diagram illustrating a set of deep learning-based fusion algorithms.

FIG. 6 is a diagram 600 illustrating a set of deep learning-based fusion algorithms 610. The set of deep learning-based fusion algorithms 610 may include one or more of a convolutional neural network (CNN) 620 or a recurrent neural network (RNN) 630. The CNN 620 may include single-stage detectors 640, e.g., region-based CNN (R-CNN), spatial pyramid pooling (SPP)-net, fast R-CNN, faster R-CNN, or other single-stage detector CNNs. The CNN 620 may also include two-stage detectors 650, e.g., you only look once (YOLO), single shot detector (SSD), deconvolutional SSD (DSSD), or other two-stage detector CNNs. In some aspects, the RNN 630 may be a long short term memory (LSTM), a gated recurrent unit (GRU), or other RNN. In some aspects, deep learning-based fusion algorithms aim to imitate the functionality of human brain. Deep learning-based fusion algorithms may be a subdivision of AI and ML and can be seen as an improvement of neural networks.

In some aspects, cameras may output bounding boxes, lane line positions, traffic light and sign status, etc. and may be the primary sensor for high-resolution tasks. However, a camera is a 2D sensor where depth information is missing. A stereo camera utilizes two or more lenses with a separate image sensor for each lens to simulate human binocular vision which gives it the ability to capture 3D dimension images (e.g., a disparity map). Radar sensors use Frequency Modulated Continuous Wave (FMCW) to reliably detect moving or stationary targets, where Lidar sensors utilize a pulsed laser to calculate an object's variable distances based on reflection return time.

In general, different combinations of sensors are employed to perform the two main tasks: 1) environmental perception—camera, Radar, and Lidar, and 2) Localization—IMU, GPS, or other sensors. However, each type of sensor has its own advantages and disadvantages. Thus, combinations of different sensors may overcome or compensate the disadvantages of single sensor and thus produce more reliable results. In order to produce more reliable results, the data processing module may use a fusion algorithm to fuse the data from multiple sensors. For example, camera and Lidar data fusion may be better for pedestrian and road detection; camera and Radar data fusion may be better for vehicle detection and lane detection; camera and IMU may better for SLAM (simultaneous localization and mapping); GPS and inertial navigation system (INS) may be better for navigation; and a fusion of map, camera, GPS, INS may be better for ego positioning.

Figure 7:
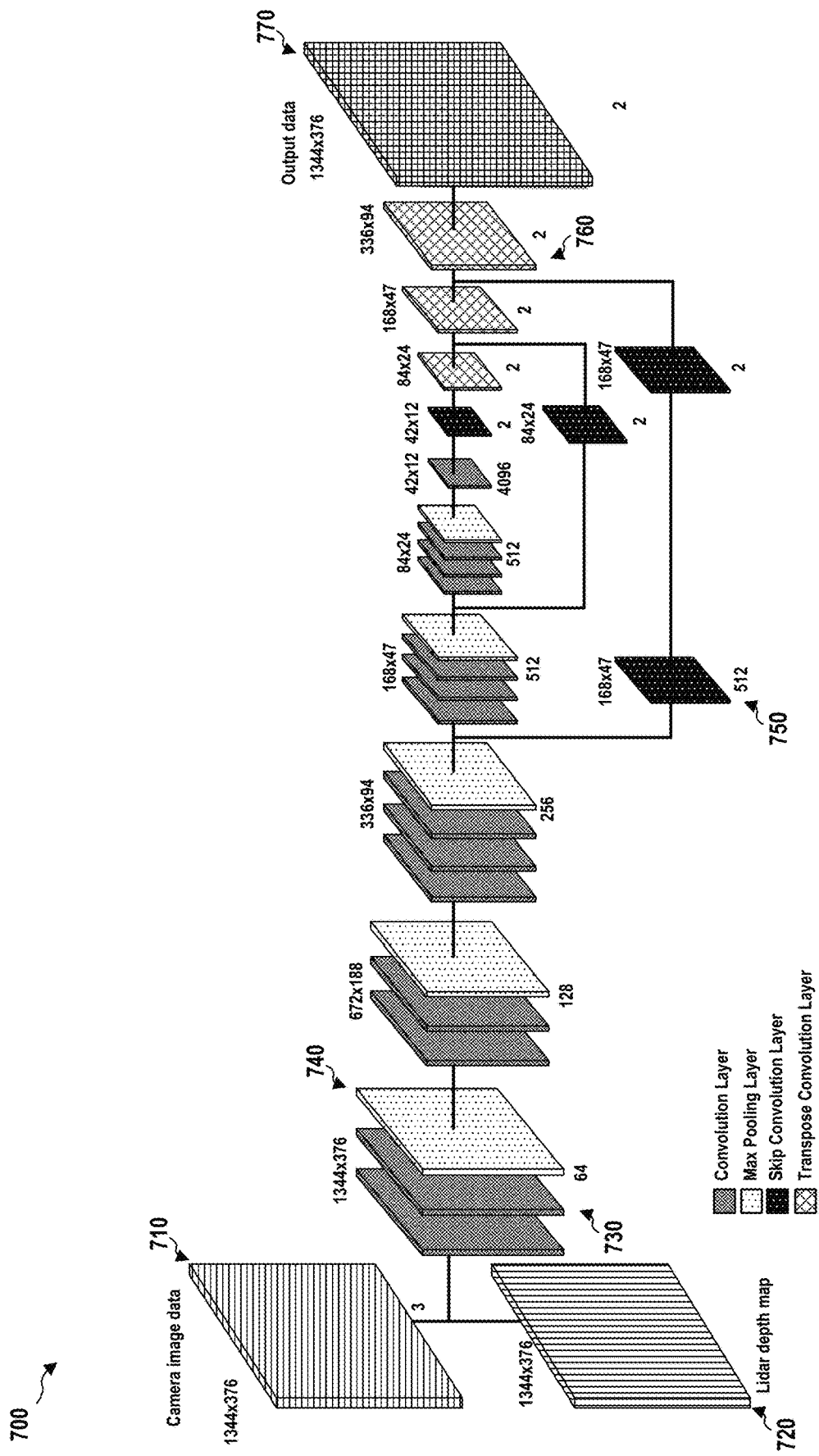
FIG. 7 illustrates an example object detection and road segmentation architecture via Fully Convolutional Neural Networks (FCNN) for camera and Lidar data fusion.

Based on the onboard sensors, different fusion algorithms can be selected and tuned to get the best fusion results. FIG. 7 illustrates an example object detection and road segmentation architecture via Fully Convolutional Neural Networks (FCNN) 700 for camera and Lidar data fusion. The FCNN 700 may receive as inputs camera image data 710 and lidar depth map 720, both having a same dimension (natively or based on a pre-processing). The camera image data 710 and Lidar depth map 720 may be processed through sets of one or more convolution layers (e.g., convolution layer 730) followed by a max pooling layer 740. Additionally, the FCNN may include skip convolution layers 750 and transpose convolution layer 760. Based on the processing, the FCNN may generate output 770.

Table 1 below illustrates an example of the detection results for road features and road hazards.

TABLE 1

| Type | X | Y | Z | Latitude | Longitude |
|---|---|---|---|---|---|
| Traffic light | 14 | 28 | 10 | 38.2564213 | −78.265841 |
| Traffic sign | 28 | 16 | / | 38.2564524 | −78.265895 |
| Lane marker | 5 | 70 | / | / | / |
| Vehicle plate | 7 | 4 | Motorcycle, USA | / | / |
| Pothole | 56 | 89 | 4 | 38.2564785 | −78.265958 |
| Debris | 52 | 31 | 8 | 38.2585642 | −78.269854 |
| Bump | 280 | 35 | 15 | 38.2565862 | −78.263516 |

As discussed above in relation to FIG. 3, each detected road feature or road hazard may be associated with measurements relating to one or more directions (e.g., x, y, and z) and a location. In some aspects, a particular direction may be associated with data regarding a type of detected road feature. For example, a z direction for a detected license plate (or other signage) may indicate the type of license plate (or sign) to be able to identify a set of benchmark measurements for comparison to a set of measurements associated with the detected object. In some aspects, the vehicle plate dimension is different from country to country, and from small motorcycles to large trucks. For example, in the United States, the dimension of a standard, full-size regular vehicle plate is 6-inches by 12-inches, while for a small-size vehicle plate (e.g. for motorcycle, or golf cart) a standard plate is 4-inches by 7-inches. The cell for the z dimension may indicate the type and/or country of the vehicle plate (or the type of road feature or sign, e.g., traffic light, stop sign, yield sign, or other traffic sign).

Figure 8:
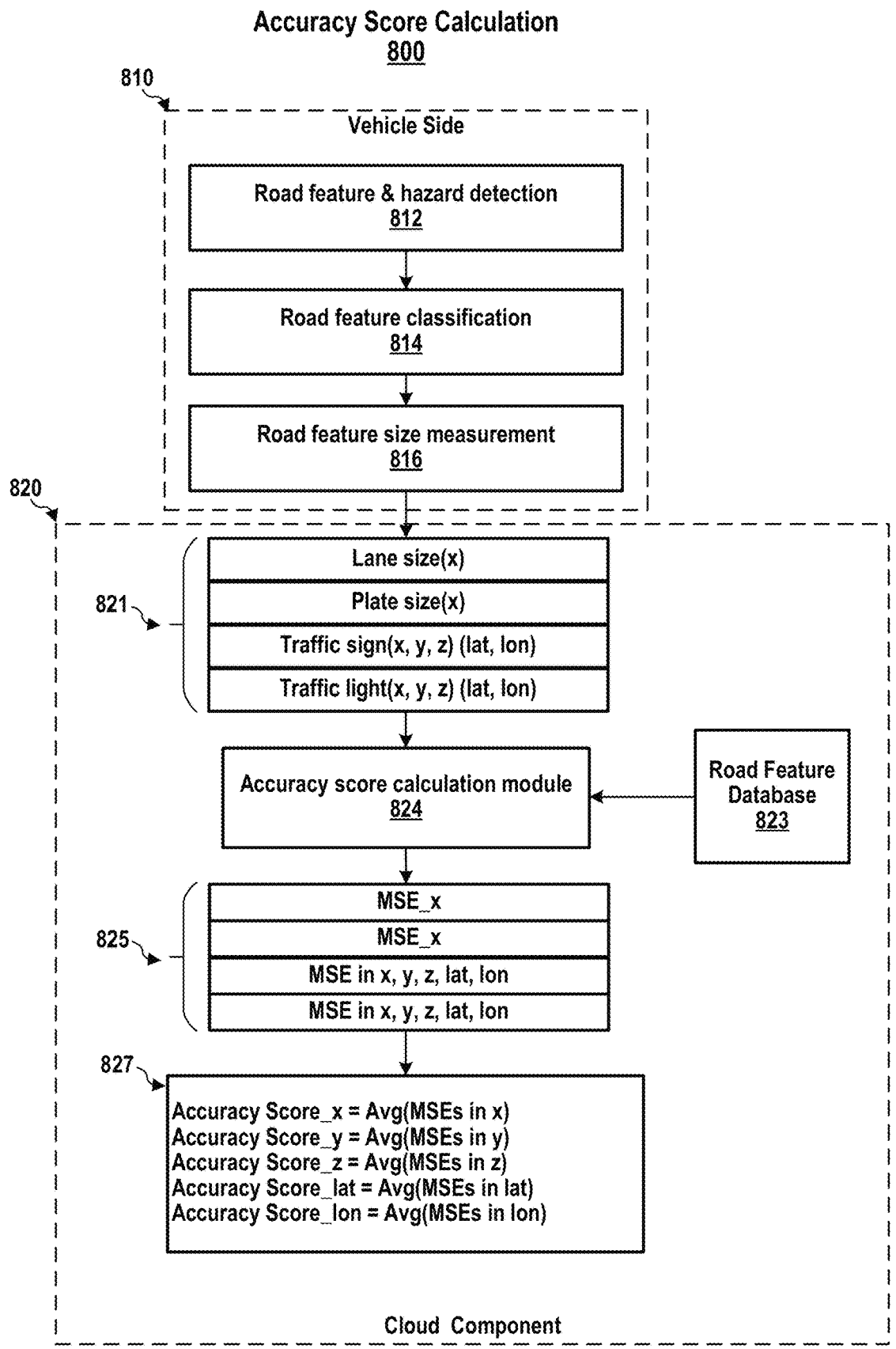
FIG. 8 illustrates an accuracy score calculation.

FIG. 8 illustrates an accuracy score calculation 800. The accuracy score calculation 800 may begin at a vehicle side 810 using a road feature and hazard detection module 812 to detect road features and hazards. The detected road features and hazards may be provided to a road feature classification module 814 to identify the nature of the detected road features and hazards (objects). For example, the road feature classification module 814 may identify a detected object as one of (1) a road feature such as a vehicle license plate, a traffic light, a traffic sign, or other non-hazardous object, or (2) a road hazard such as a pothole, debris, a bump, or other object that presents a (dynamic) road hazard (e.g., a road hazard that may be transient). The road feature classification module 814 may provide the detected and classified road features and hazards to a road feature size measurement module 816. The road feature size measurement module 816 may identify a measured size of the identified features in one or more dimensions (e.g., directions) and associate the measured size with the identified features.

For example, onboard sensors may be installed for capturing surrounding environment information. The captured information may then be provided to one or more data processing algorithms (e.g., implemented by road feature and hazard detection module 812) to detect road features (e.g. traffic sign, traffic light, lane marker, vehicle plate, and other such road features) and road hazards (e.g. pothole, debris, bump, black ice, object on road, and so on). The one or more data processing algorithms may utilize one or more different deep learning architectures (e.g., those illustrated in FIG. 6) or a combination of one or more traditional data processing algorithms (e.g., those illustrated in FIG. 5) and one or more deep learning algorithms. While the road feature and hazard detection module 812 is depicted in FIG. 8 as being deployed on the vehicle side 810, in some aspects, the road feature and hazard detection module 812 may be deployed in the cloud component with the input being transmitted with little or no pre-processing (e.g., compression without analysis). From the one or more data processing algorithms, each road feature and hazard may be associated with a size in each direction (e.g., x, y, and z) and a GPS location. As indicated in FIG. 8, different road features may be associated with different size and location fields/data. For example, a traffic light may be associated with x-, y-, and z-dimensions/fields and a GPS location field, while a traffic sign may be associated with x- and y-dimensions/fields and a GPS location field and a vehicle plate may be associated with x- and y-dimensions/fields but not a GPS location field.

The vehicle side 810 (and more specifically, the road feature size measurement module 816) may provide a set of detected road features 821 including the size measurements as well as a location (e.g., a latitude and/or longitude) to a cloud component 820 for an accuracy score calculation. Different message-transmitting protocols may be used for data sharing between a vehicle (or edge) side and the cloud component, e.g., MQ telemetry transport (MQTT), constrained application protocol (CoAP), or other message-transmitting protocol. While, in some aspects, the information regarding detected road hazards is not used to calculate the accuracy score, the transmitted data may include the information regarding the road hazards (e.g., their dimension and location data) along with a vehicle identification information (VIN) number for identifying different vehicles (e.g., to identify accuracy scores associated with particular vehicles).

The cloud component may retrieve benchmark data from a road feature database 823 and use the received set of detected road features 821 and the retrieved benchmark data to calculate an accuracy score using an accuracy score calculation module 824. For example, based on the GPS location information associated with each road feature, road feature data associated with a corresponding (e.g., same) road feature may be extracted or retrieved from a static map database (e.g., static road database 330 of FIG. 3). The accuracy score (or calculated accuracy) may be calculated based on an MSE (e.g., $MSE = 1/n\Sigma_{i=1}^{n}(Y_i - \hat{Y}_i)^2$) associated with each direction. In some aspects, each detected feature in the set of detected road features 821 may include multiple data points associated with the same detected road feature and a set of MSEs 825 (or other accuracy measure) may be calculated for each dimension associated with each detected road feature in the set of detected road features 821 based on the benchmark data retrieved from the road feature database 823. The set of MSEs 825 may then be used to generate a set of accuracy scores for each dimension in the set of accuracy scores 827. In some aspects, the accuracy scores for each dimension in the set of accuracy scores 827 is calculated as the average of the MSEs associated with the dimension.

For example, Table 2 illustrates a set of detected features and associated benchmarks. Based on the comparison of the detected features and the benchmarks, the cloud component may compute an MSE for each dimension (e.g., x, y, z, Latitude, and Longitude) as illustrated in the last row of Table 2.

TABLE 2

| Type | X | Y | Z | Latitude | Longitude |
|---|---|---|---|---|---|
| Traffic light | 14 | 28 | 10 | 38.2564213 | −78.265841 |
| Benchmark | 16 | 28 | 11 | 38.2564219 | −78.265840 |
| Traffic sign | 28 | 16 | / | 38.2564524 | −78.265895 |
| Benchmark | 27 | 15 | / | 38.2564525 | −78.265893 |
| Lane marker | 5 | 70 | / | / | / |
| Benchmark | 5 | 72 | / | / | / |
| Vehicle plate | 7 | 4 | Motorcycle, USA | / | / |
| Benchmark | 7.5 | 3.9 | Motorcycle, USA | / | / |
| MSE | 1.31 | 1.25 | 1 | 1.85*e−13 | 2.5*e−14 |

The calculated accuracy score (e.g., the MSE) may be associated with the road hazards detected by the same vehicle. Table 3 illustrates a set of detected road hazards being associated with the calculated accuracy score (e.g., MSE).

TABLE 3

| Type | X | Y | Z | Latitude | Longitude |
|---|---|---|---|---|---|
| Pothole | 14 | 28 | 10 | 38.2564213 | −78.265841 |
| Accuracy | 1.31 | 1.25 | 1 | 1.85*e−13 | 2.5*e−14 |
| Debris | 28 | 16 | / | 38.2564524 | −78.265895 |
| Accuracy | 1.31 | 1.25 | / | 1.85*e−13 | 2.5*e−14 |
| Bump | 280 | 35 | 15 | 38.2565862 | −78.263516 |
| Accuracy | 1.31 | 1.25 | 1 | 1.85*e−13 | 2.5*e−14 |

In some aspects, the accuracy score calculation 800 may include a prediction analytics layer that produces a set of road hazards with associated size, location, and accuracy data based on the operations discussed above. In some aspects, the output of the prediction analytics layer (e.g., accuracy score calculation 800) may be provided to a prescription analytics layer for (1) dynamic map-database updating and (2) generating vehicle trigger signals.

Figure 9:
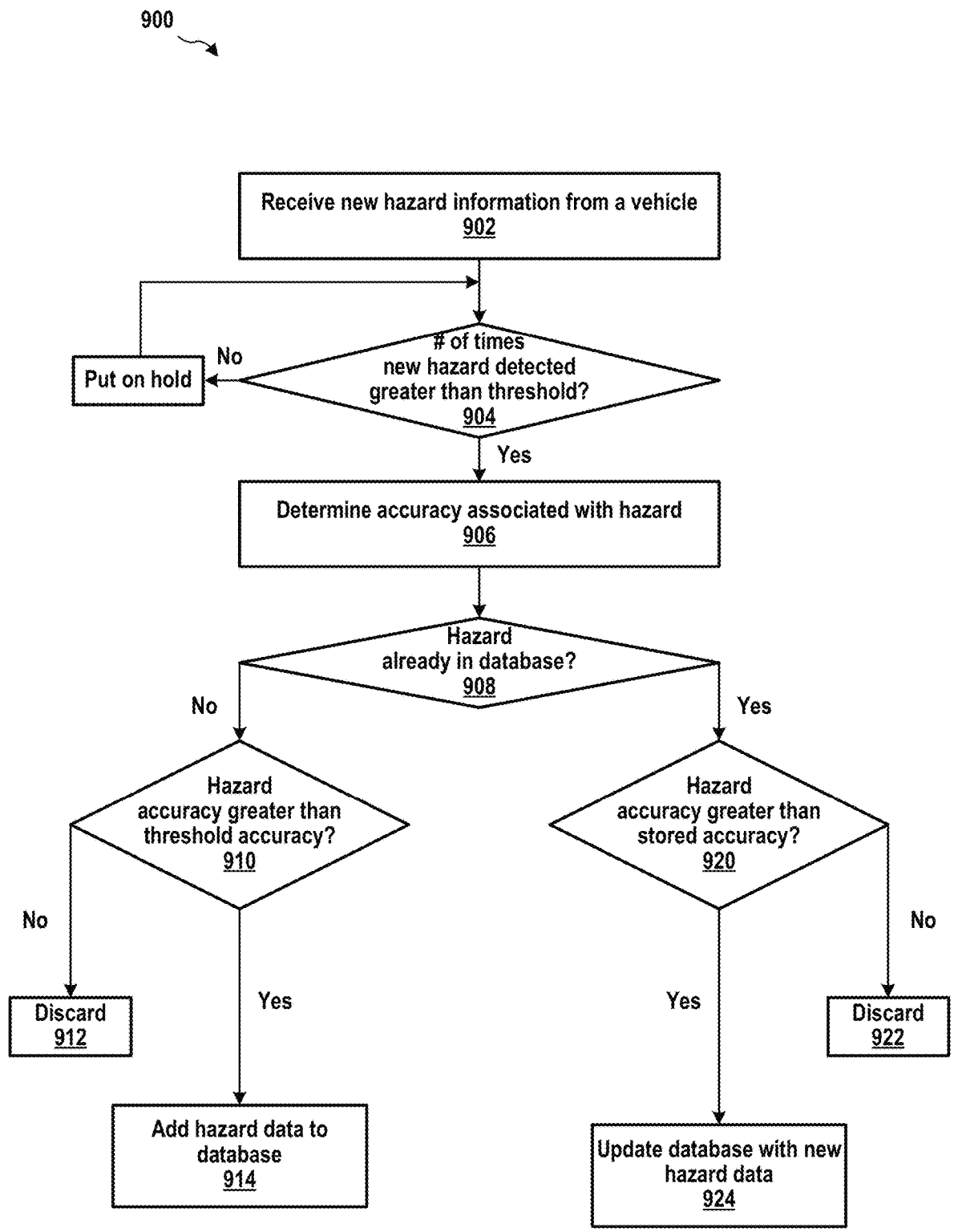
FIG. 9 illustrates an example method for updating a dynamic cloud-based road anomaly (or hazard) database.

FIG. 9 illustrates an example method 900 for updating a dynamic cloud-based road anomaly (or hazard) database. The method 900 may be performed by a prescription analytics layer of a cloud component, e.g., a prescription analytics program implemented on processors associated with the cloud component or, more generally, may be performed by the cloud component (e.g., cloud component 320 or 820). At 902, the cloud component may receive new hazard information from a particular vehicle (e.g., identified by a VIN number) that detects (or fails to detect) a hazard. The received new hazard information may include a hazard type, a location (e.g., latitude and longitude or other location identifier) and a size associated with the detected hazard. The new hazard information may further include a number of times the hazard has been detected.

At 904, the cloud component may determine whether the number of times the detected hazard has been detected is greater than a configured threshold number of detection times. In some aspects, the determination at 904 identifies false positives. For example, vehicles usually detect a hazard within certain distances, e.g., 15 m, and keep tracking or detecting the road hazard around 5 to 10 times per second until the vehicle passes the hazard or the hazard is out of the onboard sensors detection range. However, this continuous detection pattern may be missing for a false positive. Thus, by configuring a threshold number of detection times, false positives may be greatly reduced.

At 906, the cloud component may determine an accuracy (or accuracy score) associated with the new hazard information. For example, referring to FIG. 8, the cloud component 820 may calculate an accuracy score for the detected hazard based on other road feature information or data. The accuracy score may be calculated based on other road features detected, either concurrently or historically, by the same vehicle and benchmark data in a static map database (e.g., road feature database 823). The calculated accuracy may include an accuracy associated with each type of data regarding the detected hazard (e.g., a size in one or more directions, a latitude, or a longitude).

Figure 10:
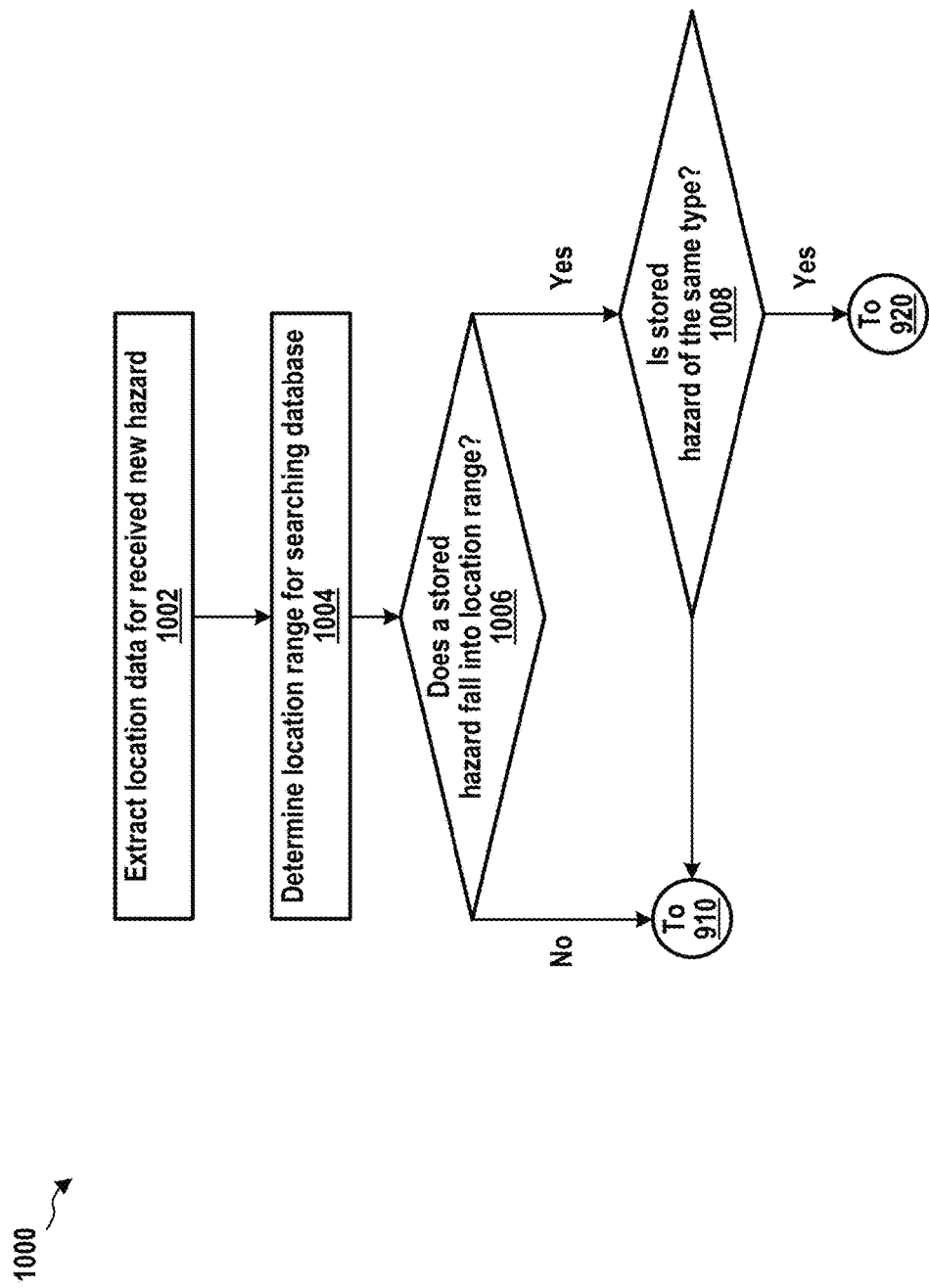
FIG. 10 illustrates an example method for determining if a detected hazard received from the vehicle is already included in a road hazard database.

At 908, the cloud component may determine if the detected hazard received from the vehicle is already included in a road hazard database. FIG. 10 illustrates an example method 1000 for determining if a detected hazard received from the vehicle is already included in a road hazard database. At 1002, the cloud component may extract location data for the received new hazard information. The location may be GPS data (e.g., including latitude and longitude) or other location data used to identify locations in the road hazard database. Based on the location data extracted at 1002, the cloud component may determine, at 1004, a location range for searching the road hazard database. The location range for searching the road hazard database may include a first range of latitude values and a second range of longitude values based on the location data extracted at 1002 and a configured threshold distance for each of the latitude and longitude such that the first (second) range is from the latitude (longitude) of the detected hazard minus the configured threshold value to the latitude (longitude) of the detected hazard plus the configured threshold value.

To determine if the detected hazard is already included in the road hazard database at 908, the cloud component may access the road hazard database (e.g., dynamic map database 340) to determine, at 1006 whether any hazard data is stored with a location that is the same as that of the detected hazard received from the vehicle (e.g., if any hazard data is stored with a latitude and longitude within the first and second ranges respectively). If the cloud component determines, at 1006, that hazard data is stored with a location that is the same as that of the detected hazard, the could component may determine, at 1008, whether the stored road hazard is of a same type, e.g., pothole, debris, bump, or other road hazard type, as the detected hazard. If the stored road hazard is determined, at 1008, to be not of a same type, the cloud component may determine, at 908, that the detected hazard is a new hazard not stored in the road hazard database, while if the stored road hazard is determined, at 1008, to be of a same type, the cloud component may determine, at 908, that the detected hazard is already stored in the road hazard database.

If the new hazard is determined, at 908, 1006, or 1008, to not already exist in the road hazard database, the cloud component may determine, at 910, if the accuracy (or accuracy score) is greater than a configured threshold accuracy. In some aspects, the configured threshold accuracy may be determined based on a level of accuracy that may be useful when trying to avoid a hazard (e.g., accurate to within a lane of a road). The accuracy associated with the detected hazard on which the determination, at 910, is based may be a lowest accuracy (e.g., highest associated MSE) associated with a particular type of information (e.g., size in any of one or more directions, or location). In some aspects, the accuracy associated with the detected hazard is an average of the accuracies associated with each of the different dimensions or the components of location data. The accuracy associated with the detected hazard, in some aspects, may be an accuracy associated with specific types of data that are deemed to be more relevant to identifying hazards (e.g., it may be more important to identify a location of a hazard to within one lane than to determine its size within 1 foot). In some aspects, different configured accuracy thresholds may be configured for different types of data to account for the different usefulness thresholds for different types of data.

At 912, if the accuracy associated with the detected hazard is determined, at 910, to be less than the threshold accuracy (e.g., if an MSE associated with the detected hazard is greater than a threshold MSE), the cloud component may discard the information regarding the detected hazard. Alternatively, if the accuracy associated with the detected hazard is determined, at 910, to be greater than the threshold accuracy (e.g., if an MSE associated with the detected hazard is less than a threshold MSE), the cloud component may add the information regarding the detected hazard to the hazard database at 914 as a new road hazard entry. For example, referring to FIG. 3, the cloud component 320 may perform a prescriptive analysis of detected hazard information received from a vehicle side 310 to determine if it meets a minimum threshold accuracy, and if the detected hazard information meets the minimum accuracy threshold, may make an update request 339 to dynamic map database 340.

If the cloud component determines, at 908 (or 1008), that the detected hazard received from the vehicle is already included in a road hazard database, the cloud component may determine, at 920, if the accuracy associated with the detected hazard is greater than the accuracy associated with the stored data. The accuracy associated with the detected hazard on which the determination, at 920, is based may be a lowest accuracy (e.g., highest associated MSE) associated with a particular type of information (e.g., size in any of one or more directions, or location). In some aspects, the accuracy associated with the detected hazard (and with the stored information) is an average of the accuracies associated with each of the different dimensions or the components of location data. The accuracy associated with the detected hazard, in some aspects, may be an accuracy associated with specific types of data that are deemed to be more relevant to identifying hazards (e.g., it may be more important to identify a location of a hazard to within one lane than to determine its size within 1 foot). In some aspects, the cloud component may determine, at 920, whether an accuracy associated with each component of the detected hazard (e.g., each direction for size, latitude, or longitude) is greater than an accuracy associated with a corresponding component of the stored hazard data.

If the cloud component determines, at 920, that the accuracy associated with the detected hazard is less than the accuracy associated with the stored hazard data, the cloud component may discard, at 922, the information regarding the detected hazard and maintaining the stored data regarding the hazard. If, on the other hand, the cloud component determines, at 920, that the accuracy associated with the detected hazard (or associated with one or more components of the information regarding the detected hazard) is greater than the accuracy associated with the stored hazard data (or associated with one or more components of the stored information corresponding to the detected hazard), the cloud component may update, at 924, the road hazard database with the detected hazard data (or the components associated with greater accuracy). By comparing accuracy (or accuracy scores) the cloud component can update (in real time) the road hazard database with the best available information. In some aspects, updating the road hazard data at 924 may include removing data from a road hazard database based on new hazard information received at 902 identifying a lack of a hazard at a location of a hazard in the road hazard database (e.g., identifying objects in an environment indicating the lack of the hazard). For example, referring to FIG. 3, the cloud component 320 may perform a prescriptive analysis of a detected hazard received from a vehicle side 310 to determine if it is associated with an accuracy that is greater than existing data stored in the dynamic map database 340, and if the detected hazard is associated with an accuracy that is greater than existing data stored in the dynamic map database 340, may make an update request 339 to dynamic map database 340 to update the data in dynamic map database 340.

Figure 11:
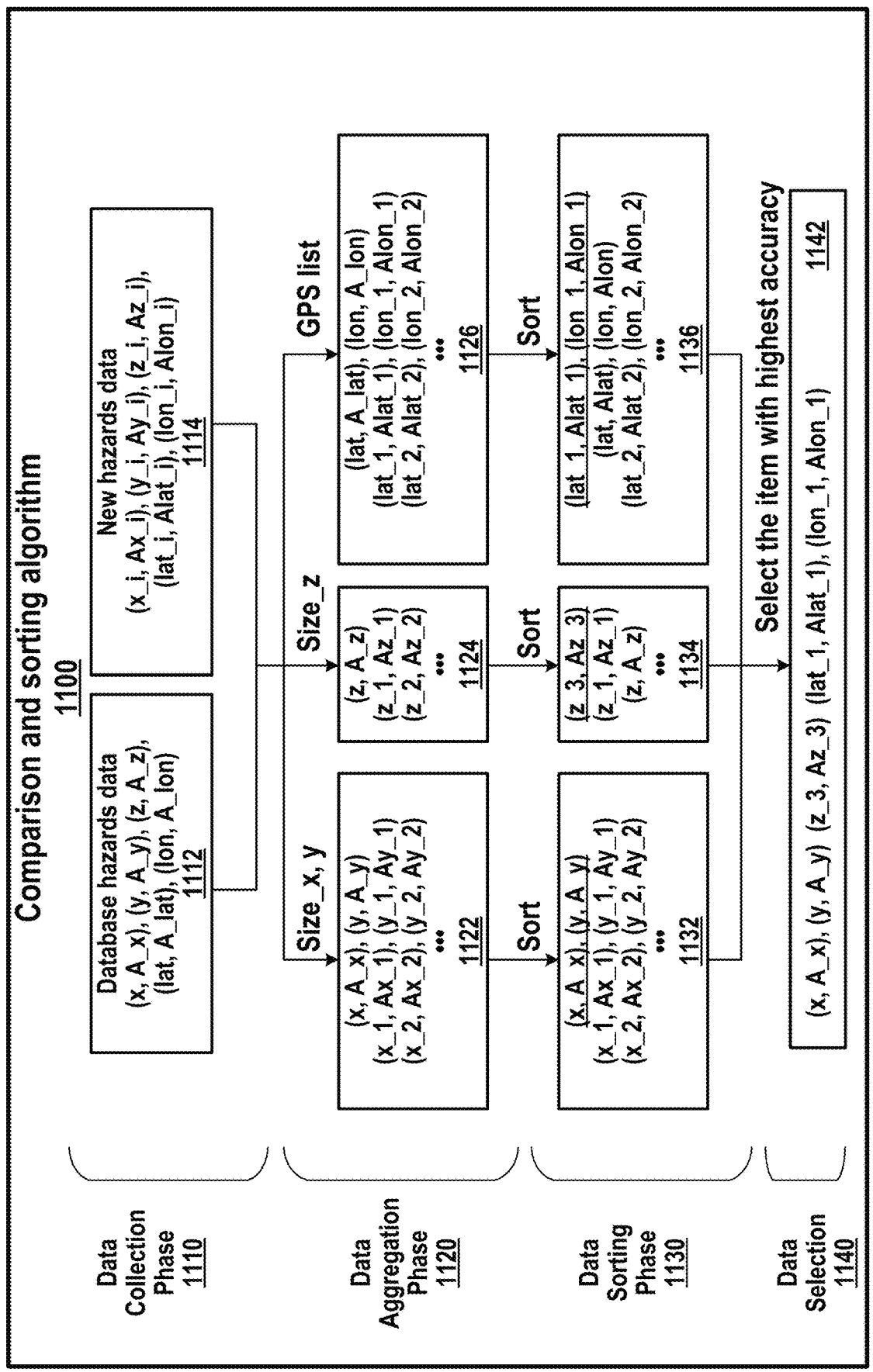
FIG. 11 illustrates a comparison and sorting algorithm that may be applied to update a road hazard database for a particular detected object that is detected by multiple vehicles and provided to the cloud component.

FIG. 11 illustrates a comparison and sorting algorithm 1100 that may be applied to update a road hazard database for a particular detected object that is detected by multiple vehicles and provided to the cloud component. It is understood that the process described in relation to the determination at 920 of FIG. 9 may be a special case of the comparison and sorting algorithm 1100 for detected hazard data received from a single vehicle. The comparison and sorting algorithm 1100 may begin with a data collection phase 1110 during which the cloud component may receive road hazard data from multiple vehicles that correspond to a particular road hazard stored in the road hazard database and extract the relevant new hazards data 1114, as described in relation the data reception at 902 of FIG. 9, and data extraction at 1002 of FIG. 10. The data collection phase 1110 may also include querying the road hazard database to retrieve database hazards data 1112 for a road hazard corresponding the received new (or newly detected) hazards.

The comparison and sorting algorithm 1100 may be performed as detected hazard data is received in an online mode. Alternatively, the comparison and sorting algorithm 1100 may be performed in an offline or batch mode (e.g., periodically or based on triggering events). For example, the comparison and sorting algorithm 1100 may be configured to run every day, every hour, or every 15 minutes depending on the type of road hazard and its expected duration (e.g., every day for potholes, every hour for a construction or work zone, and every 15 minutes for debris). A triggering event may include, e.g., a vehicle querying the road hazard database for road hazards within a range of a current location of the (ego) vehicle that includes the location of the new and stored road hazard locations for which the comparison and sorting algorithm 1100 may be performed.

In a data aggregation phase 1120, the comparison and sorting algorithm 1100 may aggregate the information for the two datasets (e.g., database hazards data 1112 and new hazards data 1114) in three groups. For example, a first group may aggregate the data for the x- and y-dimensions 1122, a second group may aggregate data for the z-dimension 1124, and third group may aggregate location (e.g., GPS) data 1126. While FIG. 11 illustrates aggregating the x-dimension and the y-dimension together, other aspects may aggregate each dimension separately. The aggregated data, in some aspects, includes an ordered pair for each component (e.g., x and y, z, or latitude and longitude) including a value and an accuracy (or accuracy score).

Once the data is aggregated, the comparison and sorting algorithm 1100 may perform a sorting operation during data sorting phase 1130. As illustrated, each group of aggregated data is sorted independently such that, for each group, data associated with a different vehicle may be selected. The sorting algorithm used during the data sorting phase 1130 may include Bubble Sort, Merge Sort, Binary Sort, or any other algorithms that can output elements in an ordered list. For example, the sorted x- and y-dimensions data 1132 identifies stored data for x- and y-dimensions (e.g., (x, A_x)(y, A_y)), the sorted z-dimension data 1134 identifies a z-dimension value associated with a third vehicle (e.g., (z_3, Az_3)), and the sorted location data 1136 identifies location data associated with a first vehicle (e.g., (lat_1, Alat_1), (lon_1, Alon_1)). When using multi-component data, such as for the x- and y-dimensions or the location data (e.g., including latitude and longitude), the ranking may be based on a lowest accuracy (or highest) value of the multi-component data. In some aspects, the average accuracy (or accuracy score) may be used to sort the multi-component data. Alternatively, the accuracy of one component may be used for the multi-component data regardless of the accuracy of the other component (e.g., based on an expectation that the x- and y-dimensions or the latitude and longitude will have similar accuracy scores).

During a data selection 1140, the comparison and sorting algorithm 1100 may select the data identified as having the highest accuracy for inclusion in the road hazard database. For example, the road hazard database may be updated to include the z-dimension value associated with a third vehicle (e.g., (z_3, Az_3)) identified by the sorted z-dimension data 1134 and the location (e.g., latitude and longitude) data (e.g., (lat_1, Alat_1), (lon_1, Alon_1)) identified by the sorted location data 1136, while the x- and y-dimensions values may not be updated based on the sorted x- and y-dimensions data 1132 identifying the stored data as being associated with the highest accuracy. Accordingly, the updated stored road hazard data 1142 in the illustrated example may be [(x, A_x), (y, A_y), (z_3, Az_3), (lat_1, Alat_1), (lon_1, Alon_1)].

Figure 12:
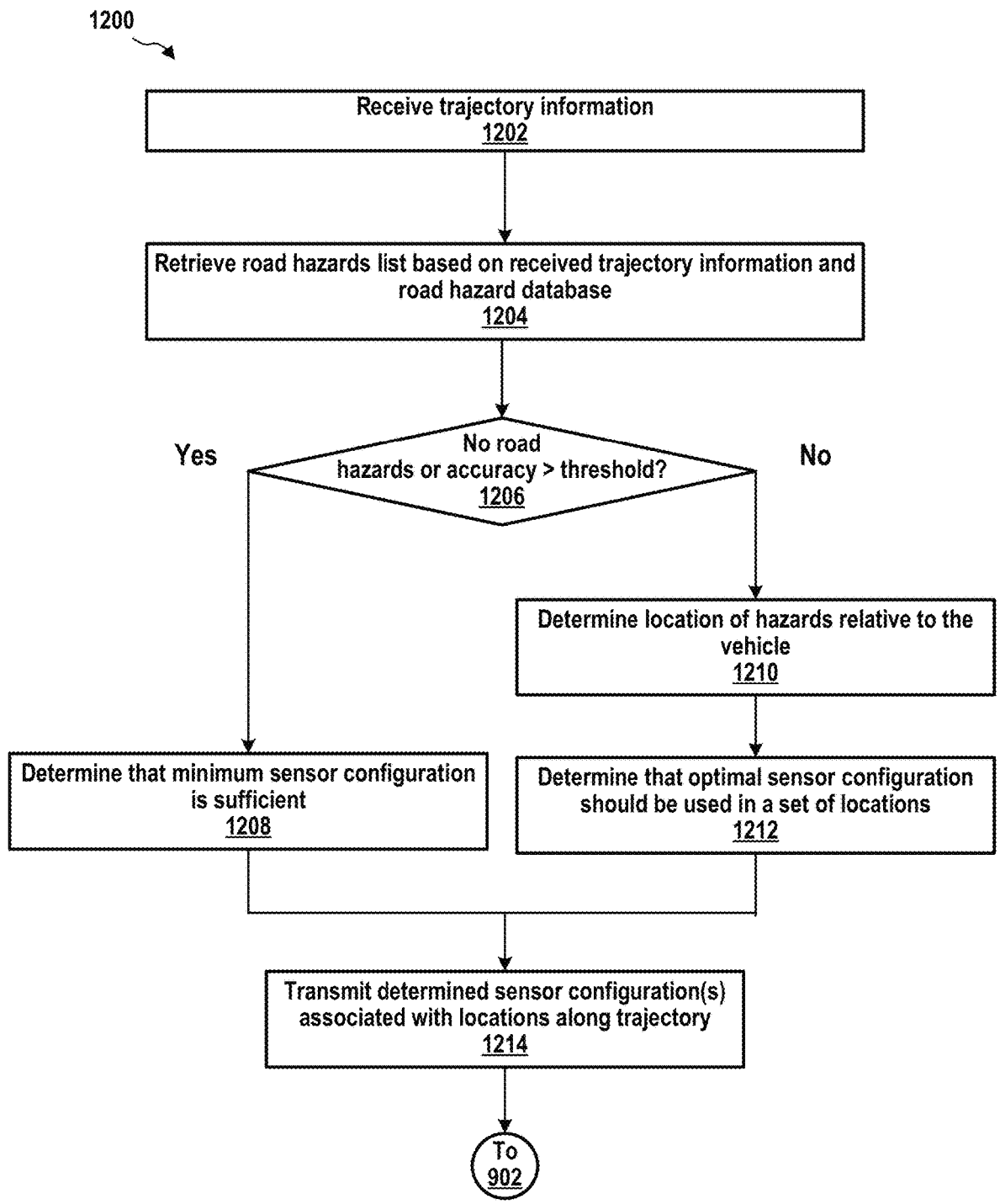
FIG. 12 illustrates a method for improving the accuracy associated with road hazards stored in a road hazard database by indicating to one or more vehicles locations to attempt to capture higher-accuracy data regarding a stored road hazard.
Figure 13:
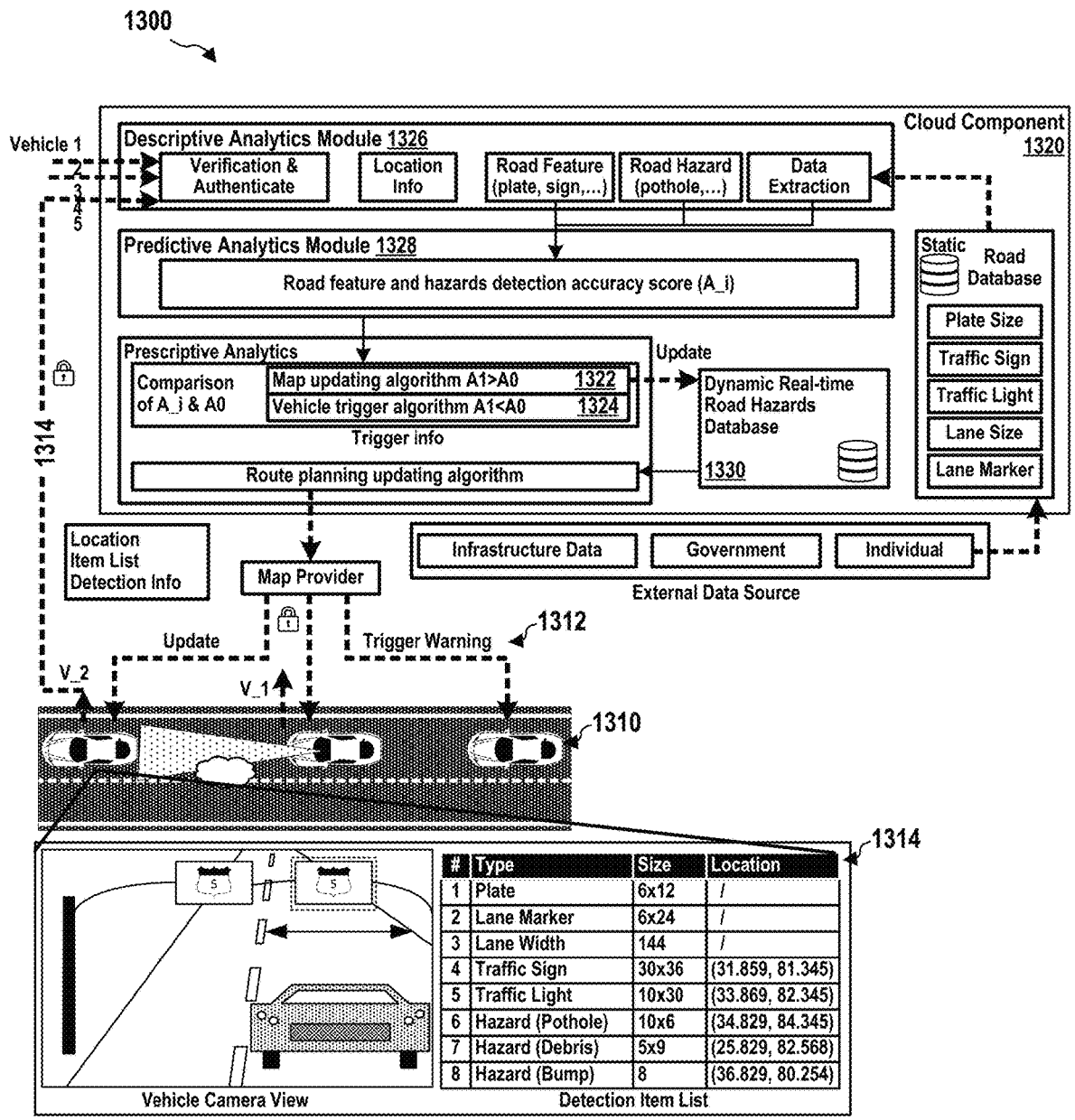
FIG. 13 illustrates a system for improving the accuracy associated with road hazards stored in a road hazard database by indicating to one or more vehicles locations to attempt to capture higher-accuracy data regarding a stored road hazard.
Figure 14:
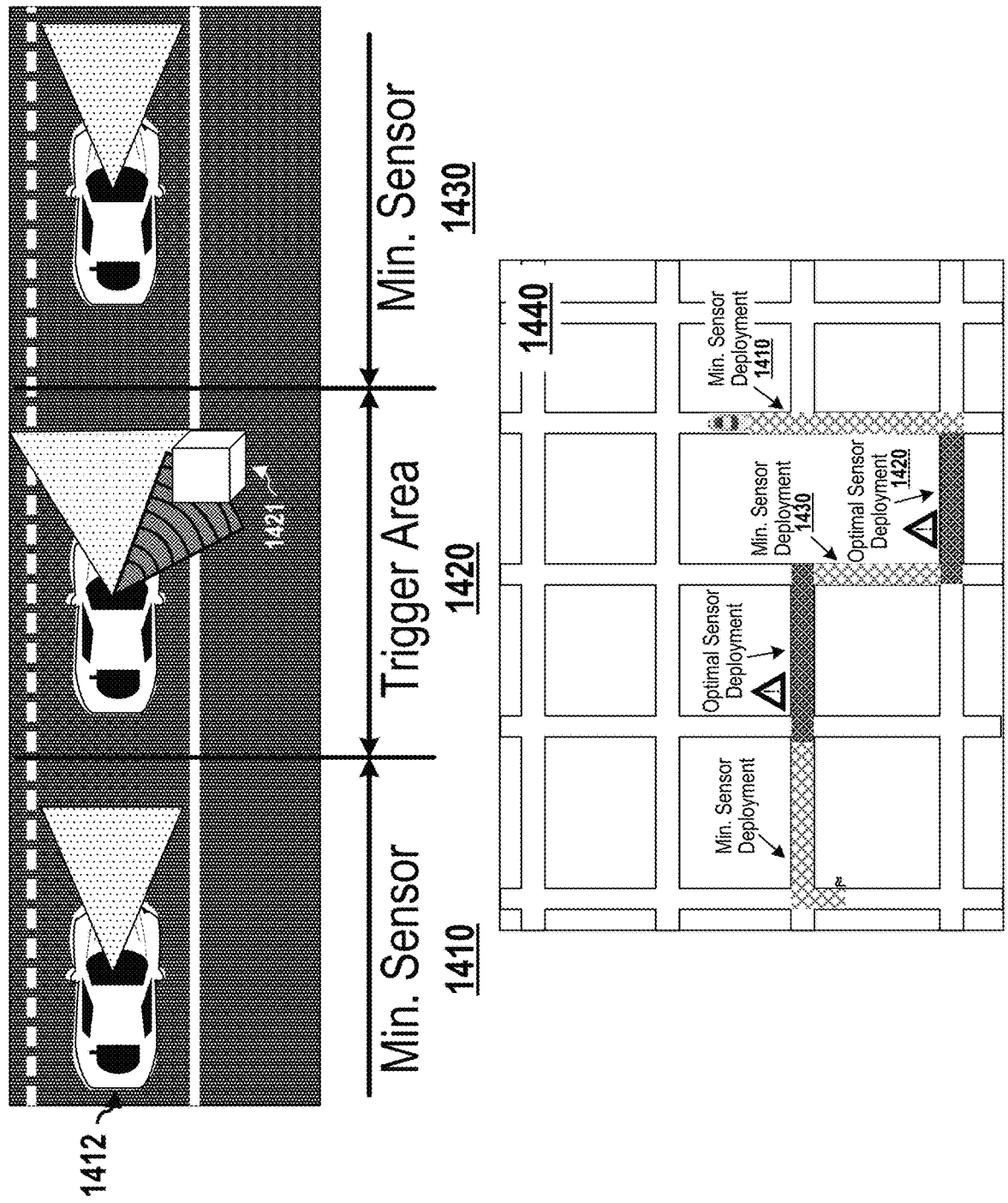
FIG. 14 illustrates an example route display with corresponding areas for which a minimum sensor configuration and for which an optimal sensor configuration may be triggered by the system of FIG. 12 employing the method illustrated in FIG. 11.

FIG. 12 illustrates a method 1200 for improving the accuracy associated with road hazards stored in a road hazard database by indicating to one or more vehicles locations to attempt to capture higher-accuracy data regarding a stored road hazard. The method may be performed by a cloud component (or a processor executing a cloud component program) of a system similar to system 300 of FIG. 3. Additionally, the method may be performed by a system as illustrated in FIG. 13 which illustrates a system 1300 for improving the accuracy associated with road hazards stored in a road hazard database by indicating to one or more vehicles locations to attempt to capture higher-accuracy data regarding a stored road hazard. FIG. 14 illustrates an example route display 1440 with corresponding areas for which a minimum sensor configuration (locations 1410 and 1430) and for which an optimal sensor configuration (location 1420) may be triggered by the system of FIG. 12 employing the comparison and sorting algorithm 1100. Accordingly, the method 1200 will be discussed in relation to FIGS. 13 and 14 in some instances.

At 1202, a cloud component (e.g., cloud component 320 or 1320) may receive trajectory information from a vehicle (e.g., vehicle 1310). The trajectory information may include a current position, a desired destination, and preferences for routes or modes of travel (e.g., no highways, no tolls, or other such user preferences) from which the cloud component may generate a route. In some aspects, the trajectory information may identify a route and may be received in a request for dynamic road hazard data for display to a user in a route display (e.g., in route display 1440).

At 1204, the cloud component may retrieve a road hazards list based on the received trajectory information (e.g., a route) and a road hazard database. In some aspects, the trajectory information may be used by the cloud component (e.g., vehicle trigger algorithm 1324) to query the road hazard database, e.g., a dynamic real-time road hazards database 1330 similar to dynamic map database 340, to retrieve the road hazards list. The road hazards list may include a list of road hazards within a certain distance of the route as identified by locations (e.g., latitude and longitude values) associated with the road hazards in the road hazard database.

At 1206, the cloud component (e.g., vehicle trigger algorithm 1324) may determine if the road hazards list is empty or, for each road hazard in the road hazards list, whether an accuracy (or accuracy score) associated with the road hazard is above a configured threshold accuracy (e.g., whether the stored road hazard characteristics like size and location have been identified with sufficient accuracy for the application). In some aspects, the threshold accuracy is based on a predicted accuracy for information from the vehicle. For example, based on data previously received from the vehicle, the cloud component may determine an accuracy associated with the vehicle and use that accuracy as the threshold accuracy value. If the cloud component (e.g., vehicle trigger algorithm 1324) determines, at 1206, either (1) that the road hazards list is empty or (2) that each road hazard in the road hazards list is associated with an accuracy above the configured threshold accuracy, the cloud component may determine, at 1208, that a minimum (e.g., low-sensitivity) sensor configuration is sufficient. A minimum sensor configuration may save power at the vehicle (e.g., vehicle 1310) and may save processing power at both the vehicle and at the cloud component as less data may be processed at the vehicle and communicated to the cloud component for further processing.

If the cloud component (e.g., vehicle trigger algorithm 1324) determines, at 1206, that the road hazards list is not empty and that at least one component associated with at least one road hazard in the road hazards list is associated with an accuracy below the configured threshold accuracy, the cloud component may determine, at 1210, a location of the at least one road hazard in relation to the vehicle's location. The cloud component may further identify the available vehicle sensors to determine which sensors to trigger in the location associated with the at least one road hazard. After determining, at 1210, the relative location of the at least one road hazard to the vehicle's location, the cloud component (e.g., vehicle trigger algorithm 1324) may determine, at 1212 that an optimal (e.g., high-sensitivity) sensor configuration should be used in a set of locations associated with the at least one road hazard. Determining, at 1212, that the optimal sensor configuration should be used may also include identifying an optimal sensor configuration for updating the particular road hazard data that is not associated with an accuracy above the configured threshold accuracy. For example, the location of the road hazard may indicate that the optimal sensor configuration applies to a right (or left) side sensor but not to the opposite side sensor, such that the vehicle may be directed to trigger the right-side sensor for obtaining more accurate information without having to have all the sensors of the vehicle triggered, thus conserving power while attempting to capture more accurate data.

Whether the cloud component has determined, at 1208, that a minimum sensor configuration is sufficient or has determined, at 1212, that an optimal sensor configuration should be used, the cloud component may transmit, at 1214 the determined sensor configuration associated with different locations along the vehicle's trajectory. For example, referring to FIGS. 13 and 14, a cloud component 1320 may transmit a trigger warning 1312 to a vehicle 1310 or 1412 to identify a location, e.g., trigger area 1420, for which an optimal sensor configuration should be used to collect data regarding an object 1421 associated with at least one accuracy that is below a threshold accuracy. FIG. 14 additionally illustrates that for areas/locations 1410 and 1430 a minimum sensor configuration may be used as no objects have been identified for which information should be collected.

After transmitting, at 1214, the determined sensor configurations for different areas along the trajectory, the triggering process may end and the cloud component may receive new road hazard data 1314 and determine whether to update the road hazard database, e.g., dynamic real-time road hazards database 1330, as described in relation to FIG. 9 using descriptive analytics module 1326 and predictive analytics module 1328. Updating the road hazard database, in some aspects, includes any of adding a road hazard to the road hazard database, updating data for an existing road hazard in the road hazard database, or removing a road hazard from the road hazard database as described in relation to operations 914 and 924 of FIG. 9. For example, if data received from one or more vehicles based on the determined sensor configurations for a particular area transmitted at 1214 indicates that a particular hazard is no longer present, the data for the particular road hazard may be removed from the road hazard database data. Received data may indicate that a particular hazard is no longer present when a smaller number of hazards (e.g., a set of hazards not including the particular hazard) are identified in the received data than are identified in the road hazard database.

Figure 15:
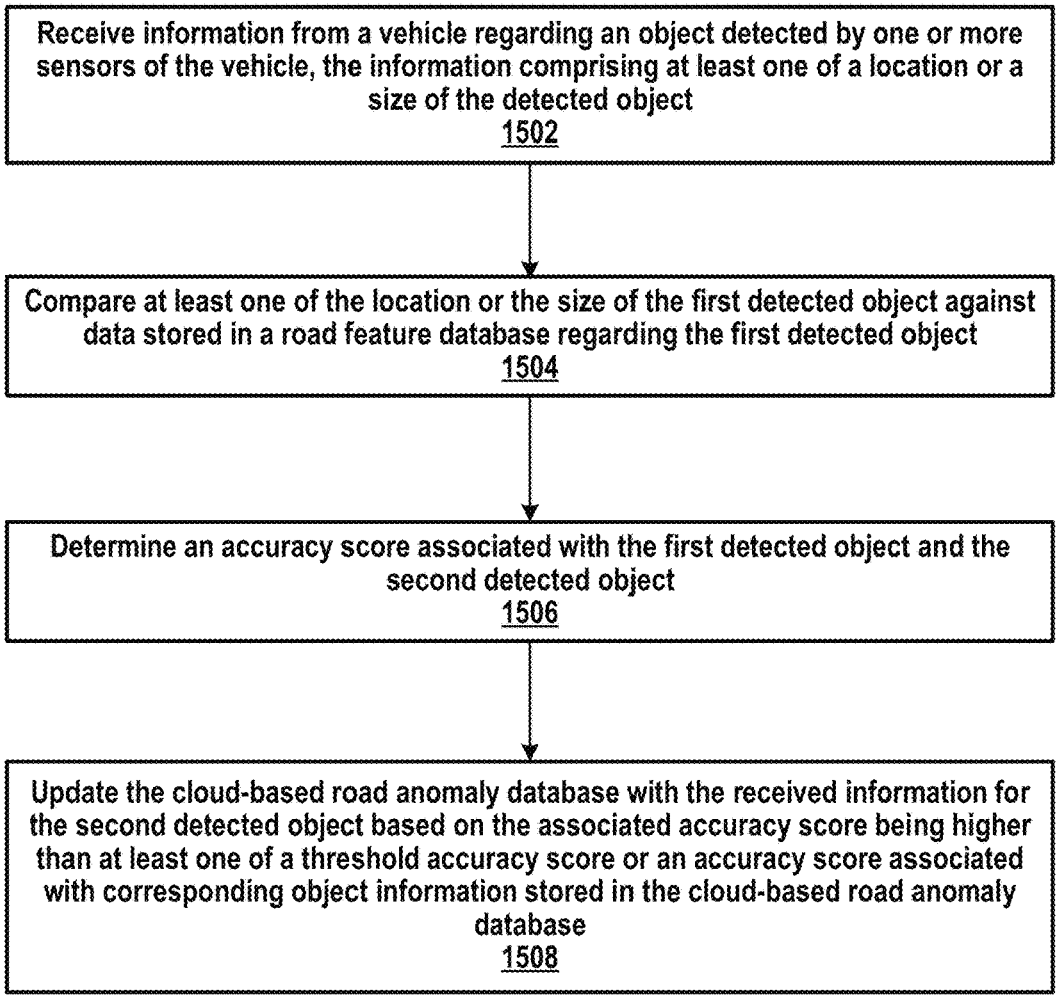
FIG. 15 illustrates a method for updating a cloud-based road anomaly (hazard) database.

FIG. 15 illustrates a method 1500 for updating a cloud-based road anomaly (hazard) database. The method may be performed by a cloud component (e.g., cloud component 320 or 1320) of a system for collecting dynamic road hazard data. While the instant application refers to a cloud component, the component performing method 1500 or the methods of FIG. 8-8 or 12 may be any system including a processor capable of executing a program to perform the operations described above. At 1502, the cloud component may receive information from a vehicle regarding a first object and a second object detected by one or more sensors of the vehicle. In some aspects, as discussed above, the information regarding each of the first and second objects includes at least one of a location or a size of the detected object. For example, referring to Table 1, the received information may include data relating to a size in one or more of three directions and location data including a latitude and longitude for a traffic light (a first detected object) and a pothole (a second detected object). In some aspects, the received information regarding the first and second detected objects comprises information regarding multiple instances of detecting the first and second objects and the accuracy score is based on multiple instances At 1504, the cloud component may compare at least one of the location or the size of the first detected object against data stored in a road feature database regarding the first detected object. For example, referring to FIG. 8, an accuracy score calculation module 824 may compare at least a first road feature to a benchmark stored for that road feature in a road features database 823. The road feature database may be a static feature database with accurate information retrieved from external sources.

At 1506, the cloud component may determine, based on comparing the at least one of the location or the size, an accuracy score associated with the second detected object. In some aspects, as indicated in FIG. 3, the accuracy score may be calculated based on the first detected object (e.g. a static road feature) and may be applied to the second detected object (e.g., the dynamic road hazard). In some aspects, multiple detected static road features may be used to determine the accuracy score associated with the detected dynamic road hazard(s). For example, referring to FIG. 8, an accuracy score calculation module 824 may determine an accuracy (or accuracy score) for a set of data by comparing at least a first road feature to a benchmark stored for that road feature and applying it to the second detected object.

At 1508, the cloud component may update the cloud-based road anomaly database with the received information for the second detected object based on the associated accuracy score being higher than at least one of a threshold accuracy score or an accuracy score associated with corresponding object information stored in the cloud-based road anomaly database. As described in relation to FIGS. 9 and 11, a corresponding road hazard stored in a road hazard database may be identified and an accuracy score associated with the detected road hazard may be compared with the accuracy score associated with the corresponding road hazard to determine to update the data stored in the road hazard. In some aspects, different components of the data regarding the detected object and the stored corresponding object are compared individually and a determination to update the road hazard database may include a decision to update less than all components of the data stored in the road hazard database as describe in relation to comparison and sorting algorithm 1100 of FIG. 11.

Figure 16:
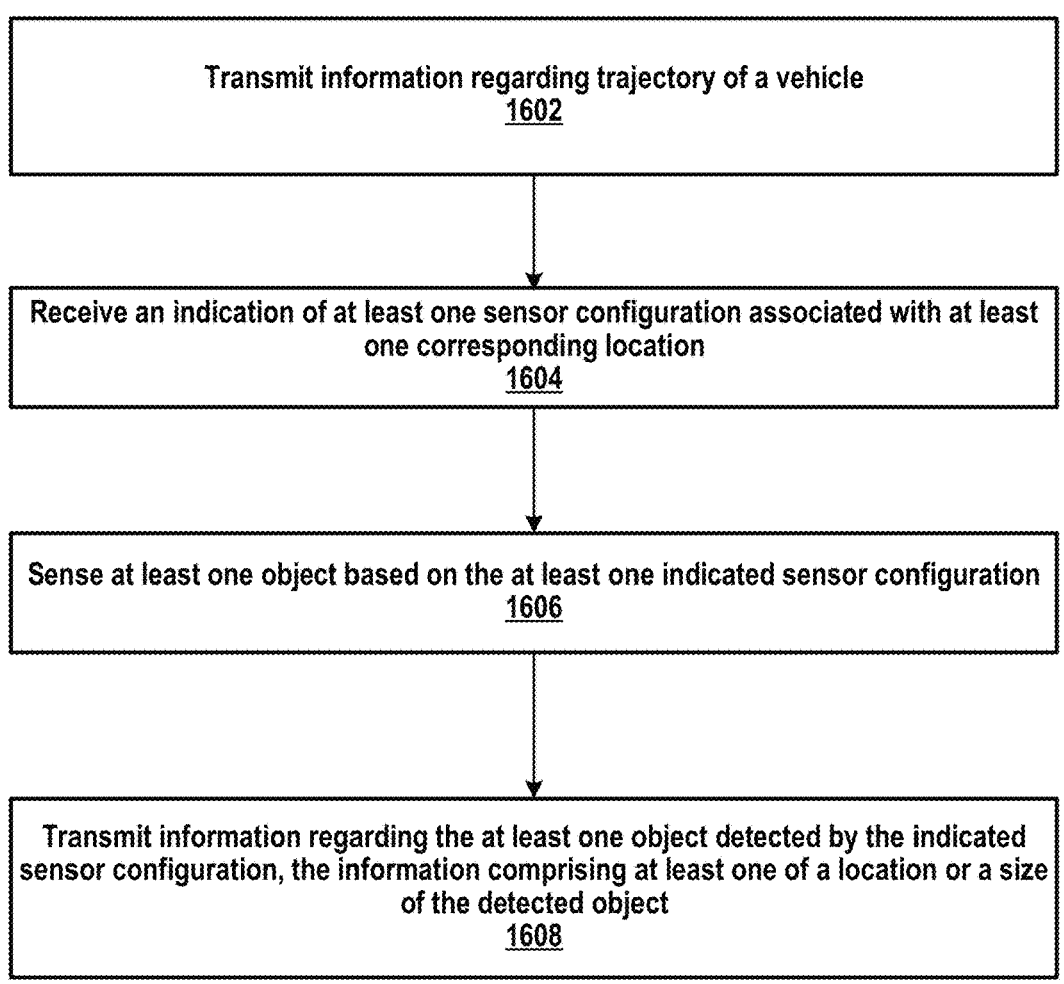
FIG. 16 illustrates a method for updating road hazard data in a cloud-based road anomaly database.

FIG. 16 illustrates a method 1600 for updating road hazard data in a cloud-based road anomaly database. The method may be performed by a vehicle (e.g., vehicle 318, 1310, or 1412). At 1602 the vehicle may transmit information regarding a trajectory of the vehicle. As discussed above, the information regarding the trajectory may include a current location and a destination. The trajectory information may be transmitted to a cloud-based route generation system (e.g., system 1300 of FIG. 13) including a cloud component in communication with a static road feature database and a dynamic road hazard database.

Based on the information transmitted at 1602, the vehicle may receive, at 1604, an indication of at least one sensor configuration associated with at least one corresponding location from a cloud-based route generation system. As discussed in relation to FIG. 14, the sensor configuration may be one of a minimum sensor configuration or an optimal sensor configuration for detecting a road hazard. The sensor configuration may indicate a set of sensors for the vehicle to enable or disable at different locations along the trajectory.

At 1606, the vehicle may sense at least one object based on the at least one indicated sensor configuration. The at least one detected object may be detected using a minimum sensor configuration or using an optimal sensor configuration. Detecting, at 1606, the at least one object may include performing a first set of processing as described in relation to FIGS. 3-8 using the data processing module, or other data fusion algorithm when multiple types of sensors are used.

Finally, at 1608, the vehicle may transmit information regarding the at least one object detected by the indicated sensor configuration to the cloud-based route generation system. The transmitted information may include data regarding data relating to a size in one or more of three directions and location data including a latitude and longitude. The transmitted information may include data for multiple detected objects and multiple instances of detecting the detected objects.

Figure 17:
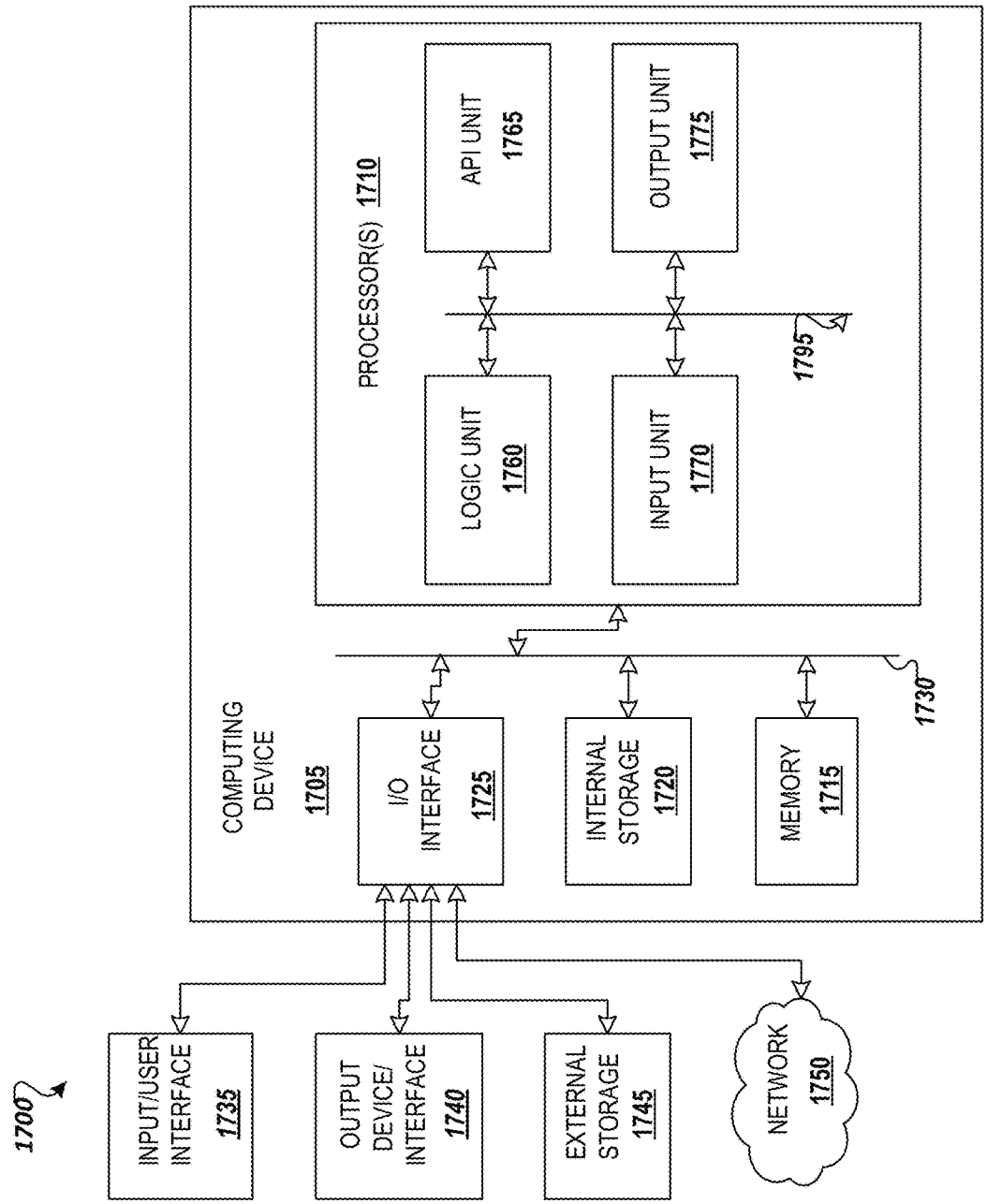
FIG. 17 illustrates an example computing environment with an example computer device suitable for use in some example implementations.

FIG. 17 illustrates an example computing environment with an example computer device suitable for use in some example implementations. Computer device 1705 in computing environment 1700 can include one or more processing units, cores, or processors 1710, memory 1715 (e.g., RAM, ROM, and/or the like), internal storage 1720 (e.g., magnetic, optical, solid-state storage, and/or organic), and/or IO interface 1725, any of which can be coupled on a communication mechanism or bus 1730 for communicating information or embedded in the computer device 1705. IO interface 1725 is also configured to receive images from cameras or provide images to projectors or displays, depending on the desired implementation.

Computer device 1705 can be communicatively coupled to input/user interface 1735 and output device/interface 1740. Either one or both of the input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1740 may include a display, television, monitor, printer, speaker, braille, or the like. In some example implementations, input/user interface 1735 and output device/interface 1740 can be embedded with or physically coupled to the computer device 1705. In other example implementations, other computer devices may function as or provide the functions of input/user interface 1735 and output device/interface 1740 for a computer device 1705.

Examples of computer device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1705 can be communicatively coupled (e.g., via IO interface 1725) to external storage 1745 and network 1750 for communicating with any number of networked components, devices, and systems, including one or more computer devices of the same or different configuration. Computer device 1705 or any connected computer device can be functioning as, providing services of, or referred to as a server, client, thin server, general machine, special-purpose machine, or another label.

IO interface 1725 can include but is not limited to, wired and/or wireless interfaces using any communication or IO protocols or standards (e.g., Ethernet, 1502.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, local area network, wide area network, a telephonic network, a cellular network, satellite network, and the like).

Computer device 1705 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1710 can execute under any operating system (OS) (not shown), in a native or virtual environment. One or more applications can be deployed that include logic unit 1760, application programming interface (API) unit 1765, input unit 1770, output unit 1775, and inter-unit communication mechanism 1795 for the different units to communicate with each other, with the OS, and with other applications (not shown). The described units and elements can be varied in design, function, configuration, or implementation and are not limited to the descriptions provided. Processor(s) 1710 can be in the form of hardware processors such as central processing units (CPUs) or in a combination of hardware and software units.

In some example implementations, when information or an execution instruction is received by API unit 1765, it may be communicated to one or more other units (e.g., logic unit 1760, input unit 1770, output unit 1775). In some instances, logic unit 1760 may be configured to control the information flow among the units and direct the services provided by API unit 1765, the input unit 1770, the output unit 1775, in some example implementations described above. For example, the flow of one or more processes or implementations may be controlled by logic unit 1760 alone or in conjunction with API unit 1765. The input unit 1770 may be configured to obtain input for the calculations described in the example implementations, and the output unit 1775 may be configured to provide an output based on the calculations described in example implementations.

Processor(s) 1710 can be configured to obtain material properties and modal properties of the physical system. The processor(s) 1710 can be configured to receive information from a vehicle regarding a first object and a second object detected by one or more sensors of the vehicle, the information comprising at least one of a location or a size of the detected object; compare at least one of the location or the size of the first detected object against data stored in a road feature database regarding the first detected object; determine, based on comparing the at least one of the location or the size, an accuracy score associated with the first detected object and the second detected object; and update the cloud-based road anomaly database with the received information for the second detected object based on the associated accuracy score being higher than at least one of a threshold accuracy score or an accuracy score associated with corresponding object information stored in the cloud-based road anomaly databases.

The processor(s) 1710 can also be configured to transmit information regarding a trajectory of a vehicle; receive an indication of at least one sensor configuration associated with at least one corresponding location associated with the trajectory of the vehicle; sense at least one object based on the at least one indicated sensor configuration; and transmit information regarding the at least one object detected by the indicated sensor configuration, the information comprising at least one of a location or a size of the detected object.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of updating a cloud-based road anomaly database, comprising:
   receiving information from a vehicle regarding a first object and a second object detected by one or more sensors of the vehicle, the information comprising at least one of a location or a size of the detected object;
   comparing at least one of the location or the size of the first detected object against data stored in a road feature database regarding the first detected object;
   determining, based on comparing the at least one of the location or the size, an accuracy score associated with the second detected object; and
   updating the cloud-based road anomaly database with the received information for the second detected object based on the associated accuracy score being higher than at least one of a threshold accuracy score or an accuracy score associated with corresponding object information stored in the cloud-based road anomaly database.

2. The method of claim 1, further comprising:
   determining a path of the vehicle;
   identifying at least one set of object information stored in the cloud-based road anomaly database associated with an object along the determined path;

predicting an accuracy score for information from the vehicle regarding the object along the determined path; and transmitting, based on the predicted accuracy score, an indication of a sensor configuration to the vehicle.

3. The method of claim 2, wherein the indication of the sensor configuration comprises:
a high-sensitivity configuration when the predicted accuracy score is higher than the accuracy score of the information stored in the cloud-based road anomaly database associated with the object along the determined path; and
a low-sensitivity configuration when the predicted accuracy score is lower than the accuracy score of the information stored in the cloud-based road anomaly database associated with the object along the determined path.

4. The method of claim 1, wherein determining the accuracy score associated with the second detected object comprises determining an accuracy score associated with the first detected object and associating, with the second detected object, the determined accuracy score for the first detected object.

5. The method of claim 4, wherein determining the accuracy score associated with the first detected object further comprises determining the accuracy score based on a magnitude of a difference between the received information regarding the first detected object and the data stored in the road feature database regarding the first detected object.

6. The method of claim 1, wherein the accuracy score comprises an accuracy score for at least one of a first direction, a second direction, a third direction, a longitude, or a latitude.

7. The method of claim 1, wherein the received information regarding the first and second detected objects comprises information regarding a plurality of instances of detecting the first and second objects and the accuracy score is based on the plurality of instances.

8. The method of claim 1, further comprising:
receiving information from the vehicle regarding an additional object detected by the one or more sensors of the vehicle, wherein the received information regarding the detected additional object comprises information regarding a first number of instances of detecting the additional object;
determining that no data regarding a corresponding object is stored in the cloud-based road anomaly database; and
adding the detected additional object to the cloud-based road anomaly database based on the first number of instances being greater than a threshold number of detection instances.

9. The method of claim 8, further comprising:
determining an accuracy score associated with the first number of instances of detecting the additional object, wherein adding the detected additional object to the cloud-based road anomaly database is further based on the accuracy score being greater than a threshold accuracy score.

10. The method of claim 1, further comprising:
receiving information from the vehicle regarding an additional object detected by the one or more sensors of the vehicle;
determining an additional accuracy score associated with the detected additional object;
determining that data associated with a corresponding object is stored in the cloud-based road anomaly database, the stored data comprising a stored accuracy score; and
not updating the cloud-based road anomaly database with the received information for the detected additional object based on the determined additional accuracy score being lower than the stored accuracy score.

11. An apparatus for updating a cloud-based road anomaly database, comprising:
means for receiving information from a vehicle regarding a first object and a second object detected by one or more sensors of the vehicle, the information comprising at least one of a location or a size of the detected object;
means for comparing at least one of the location or the size of the first detected object against data stored in a road feature database regarding the first detected object;
means for determining, based on comparing the at least one of the location or the size, an accuracy score associated with the second detected object; and
means for updating the cloud-based road anomaly database with the received information for the second detected object based on the associated accuracy score being higher than at least one of a threshold accuracy score or an accuracy score associated with corresponding object information stored in the cloud-based road anomaly database.

12. The apparatus of claim 11, further comprising:
means for determining a path of the vehicle;
means for identifying at least one set of object information stored in the cloud-based road anomaly database associated with an object along the determined path;
means for determining that an accuracy score associated with at least one object along the determined path is associated with an accuracy score that is below a threshold accuracy score; and
means for transmitting to the vehicle, based on determining that the accuracy score associated with the at least one object along the determined path is associated with the accuracy score that is below the threshold accuracy score, an indication of a sensor configuration associated with a location along the determined path associated with the object along the determined path for the vehicle to use to detect the object along the determined path.

13. The apparatus of claim 12, further comprising:
means for receiving information from the vehicle regarding the location associated with the at least one object along the determined path collected by the one or more sensors of the vehicle;
means for determining an additional accuracy score associated with the received information;
means for determining that the at least one object is no longer at the location; and
means for updating the cloud-based road anomaly database to remove the at least one object based on the additional accuracy score associated with the received information indicating that the at least one object is no longer at the location being higher than the stored accuracy score.

* * * * *